US012472743B2

(12) United States Patent
Komatsu et al.

(10) Patent No.: US 12,472,743 B2
(45) Date of Patent: Nov. 18, 2025

(54) LIQUID DISCHARGE APPARATUS AND CONTROL METHOD OF LIQUID DISCHARGE APPARATUS

(71) Applicant: SEIKO EPSON CORPORATION, Tokyo (JP)

(72) Inventors: Yuta Komatsu, Shiojiri (JP); Takeo Seino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 18/446,545

(22) Filed: Aug. 9, 2023

(65) Prior Publication Data

US 2024/0051300 A1 Feb. 15, 2024

(30) Foreign Application Priority Data

Aug. 10, 2022 (JP) ................................ 2022-127732

(51) Int. Cl.
*B41J 2/165* (2006.01)

(52) U.S. Cl.
CPC ....... *B41J 2/16511* (2013.01); *B41J 2/16508* (2013.01); *B41J 2/16523* (2013.01); *B41J 2/16526* (2013.01); *B41J 2/16517* (2013.01)

(58) Field of Classification Search
CPC ................ B41J 2/16511; B41J 2/16508; B41J 2/16523; B41J 2/16526
See application file for complete search history.

(56) References Cited

U.S. PATENT DOCUMENTS 10,035,345 B2 * 7/2018 Hattori ................. B41J 2/16508
2022/0040979 A1 2/2022 Takanashi et al.

FOREIGN PATENT DOCUMENTS

JP 2022-030421 A 2/2022

* cited by examiner

*Primary Examiner* — Geoffrey S Mruk
(74) *Attorney, Agent, or Firm* — WORKMAN NYDEGGER

(57) ABSTRACT

A liquid discharge apparatus includes a cap configured to form a capping space by contacting a liquid discharge portion, a moisturizing liquid accommodating portion configured to accommodate a moisturizing liquid that moisturizes the cap, an accommodating body mounting portion to which an accommodating body that accommodates a concentration adjusting liquid is detachably mounted, the adjusting liquid being for adjusting a liquid amount of the moisturizing liquid accommodated in the moisturizing liquid accommodating portion, a replacement detecting portion, and a control portion that controls maintenance related to the moisturizing liquid, in which when the replacement detecting portion detects replacement of the accommodating body, the control portion restricts the maintenance related to the moisturizing liquid until a predetermined time elapses after the replacement of the accommodating body is detected.

10 Claims, 17 Drawing Sheets

LIQUID DISCHARGE APPARATUS AND CONTROL METHOD OF LIQUID DISCHARGE APPARATUS

The present application is based on, and claims priority from JP Application Serial Number 2022-127732, filed Aug. 10, 2022, the disclosure of which is hereby incorporated by reference herein in its entirety.

BACKGROUND

1. Technical Field

The present disclosure relates to a liquid discharge apparatus and a control method of the liquid discharge apparatus.

2. Related Art

JP-A-2022-30421 discloses a liquid discharge apparatus including a recording portion that performs recording by discharging a liquid from a nozzle to a medium, a cap that is configured to form a space surrounding an opening of the nozzle, a humidifying fluid accommodating portion that accommodates a humidifying fluid for humidifying the cap. The recording portion is an example of a liquid discharge portion. The humidifying fluid is an example of a moisturizing liquid, and the humidifying fluid accommodating portion is an example of a moisturizing liquid accommodating portion. Further, it is disclosed that the liquid amount of the humidifying fluid accommodated in the humidifying fluid accommodating portion is adjusted by the supply of moisture from the replaceable moisture accommodating portion. Moisture is an example of an adjusting liquid, and the moisture accommodating portion is an example of an adjusting liquid accommodating portion.

However, in the liquid discharge apparatus of JP-A-2022-30421, when the moisture accommodated in the moisture accommodating portion after the replacement is frozen, there is a risk that the maintenance, related to the humidifying fluid, to be performed after the replacement cannot be normally performed.

SUMMARY

According to a preferred aspect of the present disclosure, a liquid discharge apparatus includes a liquid discharge portion that discharges a liquid from a nozzle, a cap configured to form a closed space to which the nozzle opens by contacting the liquid discharge portion, a moisturizing liquid accommodating portion configured to accommodate a moisturizing liquid that moisturizes the cap, an accommodating body mounting portion to which an accommodating body that accommodates an adjusting liquid is detachably mounted, the adjusting liquid being for adjusting a liquid amount of the moisturizing liquid accommodated in the moisturizing liquid accommodating portion, a replacement detecting portion configured to detect replacement of the accommodating body mounted on the accommodating body mounting portion, and a control portion that controls maintenance related to the moisturizing liquid, in which when the replacement detecting portion detects the replacement of the accommodating body, the control portion restricts the maintenance related to the moisturizing liquid until a predetermined time elapses after the replacement of the accommodating body is detected.

According to another preferred aspect, a liquid discharge apparatus includes a liquid discharge portion that discharges a liquid from a nozzle, a cap configured to form a closed space to which the nozzle opens by contacting the liquid discharge portion, a moisturizing liquid accommodating portion configured to accommodate a moisturizing liquid that moisturizes the cap, an adjusting liquid accommodating portion that accommodates an adjusting liquid for adjusting a concentration of the moisturizing liquid, a control portion that controls maintenance related to the moisturizing liquid, and a main body in which the liquid discharge portion, the cap, the moisturizing liquid accommodating portion, the adjusting liquid accommodating portion, and the control portion are disposed, in which the control portion restricts the maintenance related to the moisturizing liquid when an ambient temperature of the main body is lower than a preset threshold value.

According to still another preferred aspect of the present disclosure, a control method of a liquid discharge apparatus including a liquid discharge portion that discharges a liquid from a nozzle, a cap that is configured to form a closed space to which the nozzle opens in contact with the liquid discharge portion, a moisturizing liquid accommodating portion that accommodates a moisturizing liquid that moisturizes the cap, and an accommodating body mounting portion that is configured to mount an accommodating body that accommodates an adjusting liquid for adjusting a concentration of the moisturizing liquid, the control method includes detecting replacement of the accommodating body mounted in the accommodating body mounting portion, and performing maintenance related to the moisturizing liquid, in which when replacement of the accommodating body is detected, the maintenance related to the moisturizing liquid is restricted until a predetermined time elapses after the replacement of the accommodating body is detected.

DESCRIPTION OF EMBODIMENTS

Figure 1:
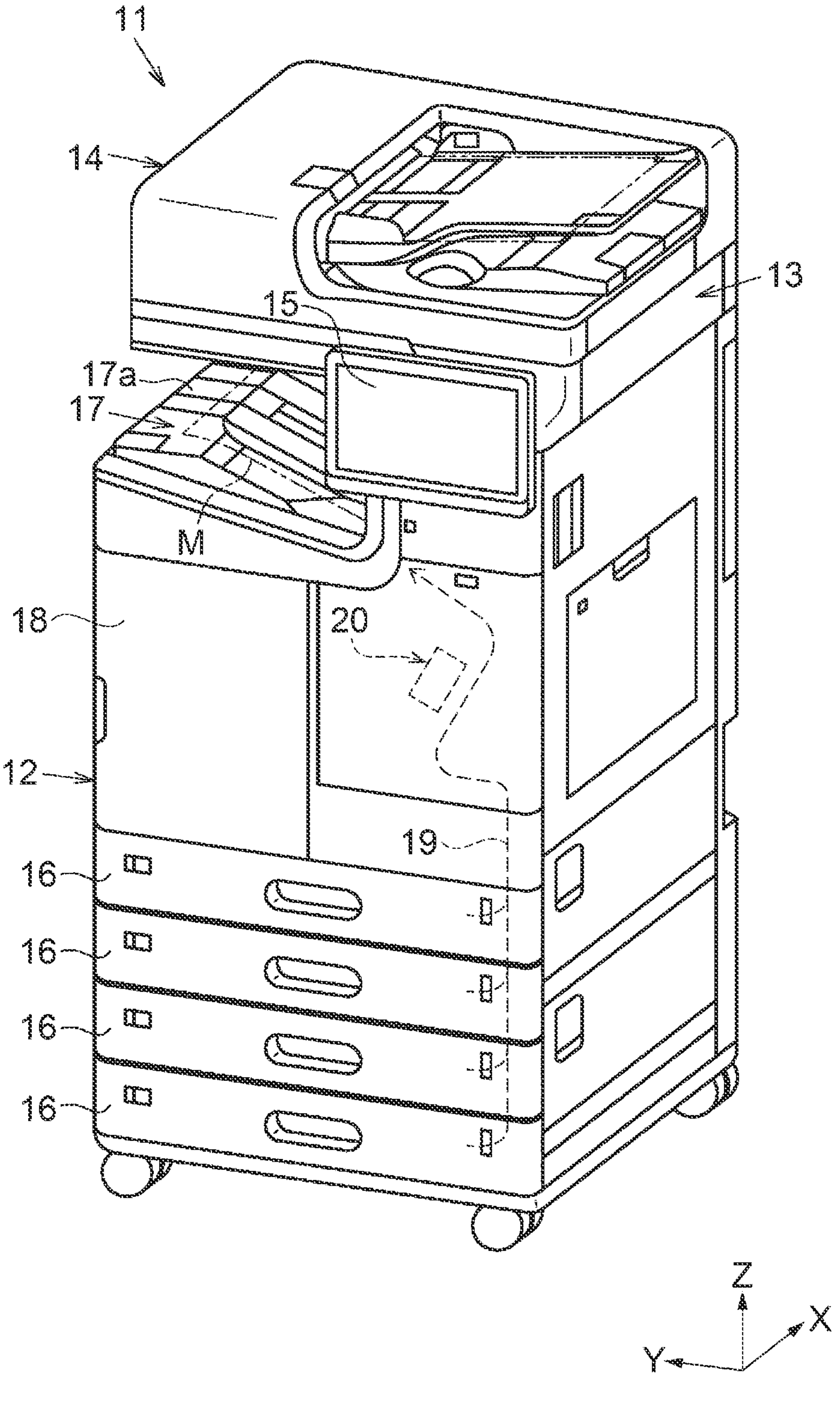
FIG. 1 is a perspective view of a liquid discharge apparatus as an embodiment of the present disclosure.

Hereinafter, the present disclosure will be described based on an embodiment. A liquid discharge apparatus is, for example, an ink jet printer that discharges and records ink, which is an example of a liquid, onto a medium such as paper or cloth.

In each figure, the same members are designated by the same reference numerals, and redundant descriptions will be omitted. In the present specification, "same", "equal", and "simultaneous" not only mean that they are completely the same, but also a case where they are the same in consideration of a measurement error, a case where they are the same in consideration of manufacturing variation of members, and a case where they are the same as long as the functions are not impaired are included. Therefore, for example, "the dimensions of both are the same" means that the dimensional difference between the two is within +10%, more preferably within +5%, and particularly preferably within 3% of one of the dimensions, in consideration of the measurement error and the manufacturing variation of members.

Further, in each figure, X, Y, and Z represent three spatial axes that are orthogonal to each other. In the present specification, the directions along these axes are referred to as an X-axis direction, a Y-axis direction, and a Z-axis direction. When specifying the direction, the positive direction is "+", the negative direction is "−", and by using the positive and negative signs together in the direction notation, the direction in which the arrow points in each figure will be described as the + direction, and the direction opposite to the arrow will be described as the − direction.

Further, the Z-axis direction indicates a gravity direction, the +Z direction indicates a vertically upward direction, and the −Z direction indicates a vertically downward direction. Therefore, the Z-axis direction may be referred to as a vertical direction. Further, a plane including the X-axis and the Y-axis will be described as an X-Y plane, a plane including the X-axis and the Z-axis will be described as an X-Z plane, and a plane including the Y-axis and the Z-axis will be described as a Y-Z plane. Further, the X-Y plane is a horizontal plane. Further, the three X, Y, and Z spatial axes that do not limit the positive direction and the negative direction will be described as the X-axis, the Y-axis, and the Z-axis.

In each figure, the X-axis direction is the depth direction of a liquid discharge apparatus 11, the path width direction of a transport path 19, and the width direction of a medium M. In the X-axis direction, the +X direction is a direction from the front surface of the liquid discharge apparatus 11 toward the back surface of the liquid discharge apparatus 11. The −X direction is a direction from the back surface of the liquid discharge apparatus 11 toward the front surface of the liquid discharge apparatus 11.

1. First Embodiment

As illustrated in FIG. 1, the liquid discharge apparatus 11 includes a rectangular main body 12, and an image reading portion 13 and an automatic feeding portion 14 attached to the +Z direction side of the main body 12. The liquid discharge apparatus 11 has a configuration in which the main body 12, the image reading portion 13, and the automatic feeding portion 14 are stacked in this order from the side of the −Z direction in the Z-axis direction.

The image reading portion 13 is configured to be capable of reading an image such as a character or a photograph recorded on a document. The automatic feeding portion 14 is configured to be capable of feeding a document to the image reading portion 13. Further, the image reading portion 13 has an operation portion 15 that is operated when an instruction is given to the liquid discharge apparatus 11. The operation portion 15 has, for example, a touch panel type liquid crystal screen, an operation button, and the like.

The main body 12 has a plurality of medium accommodating portions 16 that is configured to accommodate the medium M such as paper. The main body 12 in the present embodiment has a total of the four medium accommodating portions 16. The medium accommodating portion 16 is configured to be retractable with respect to the main body 12. Further, the main body 12 has a liquid discharge portion 20 that performs recording by discharging ink on the medium M in the main body 12. Further, the main body 12 has a stacking portion 17 on which the medium M in which recording has been performed is placed on the side of the +Z direction thereof. The stacking portion 17 has a placement surface 17*a* on which the medium M is placed. The number of the medium accommodating portions 16 may be only one.

The medium M accommodated in the medium accommodating portion 16 passes through the liquid discharge portion 20 from the medium accommodating portion 16 along the transport path 19, and is transported to the stacking portion 17. A feeding roller (not illustrated) is in contact with the uppermost medium M among a plurality of media M accommodated in the medium accommodating portion 16 and rotates, so that the uppermost medium M is sent from the medium accommodating portion 16 toward the liquid discharge portion 20 positioned on the side of the +Z direction of the medium accommodating portion 16. When the medium M passes through the liquid discharge portion 20, the liquid discharge portion 20 discharges ink from a nozzle 22 (see FIG. 2) toward the medium M, and adheres the discharged ink to the medium M for recording. The medium M after recording is discharged toward the stacking portion 17 by a discharge roller pair (not illustrated).

Figure 3:
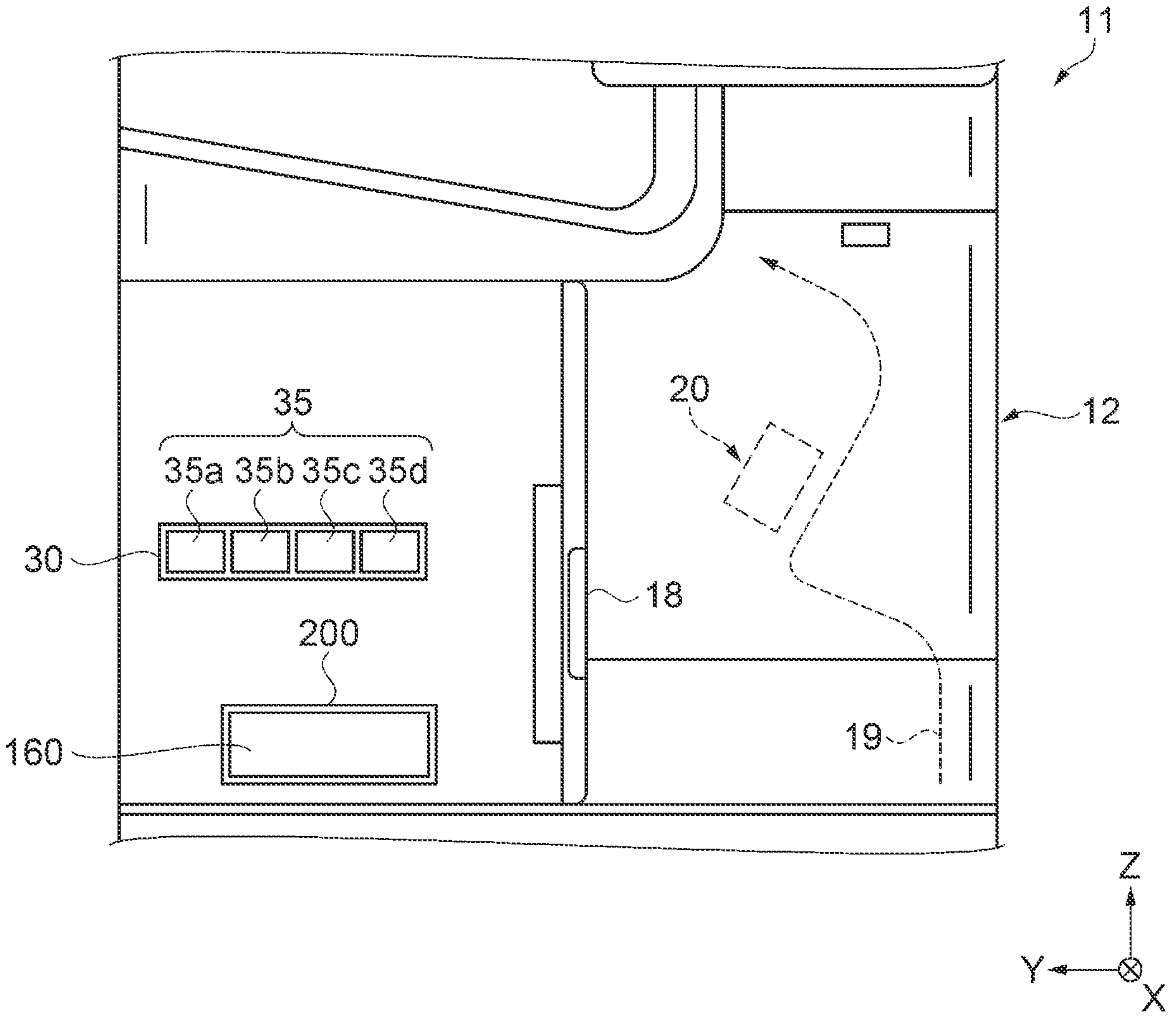
FIG. 3 is a partial front view of the liquid discharge apparatus with a door in an open state.

The main body 12 includes a door 18 on the front surface, which is a side surface on the side of the −X direction. As illustrated in FIG. 3, the door 18 can take an open state in which the liquid accommodating body mounting portion 30 and an accommodating body mounting portion 200 included in the main body 12 of the liquid discharge apparatus 11 are accessible to a user, and a closed state (see FIG. 1) in which the liquid accommodating body mounting portion 30 and the accommodating body mounting portion 200 are covered.

Figure 2:
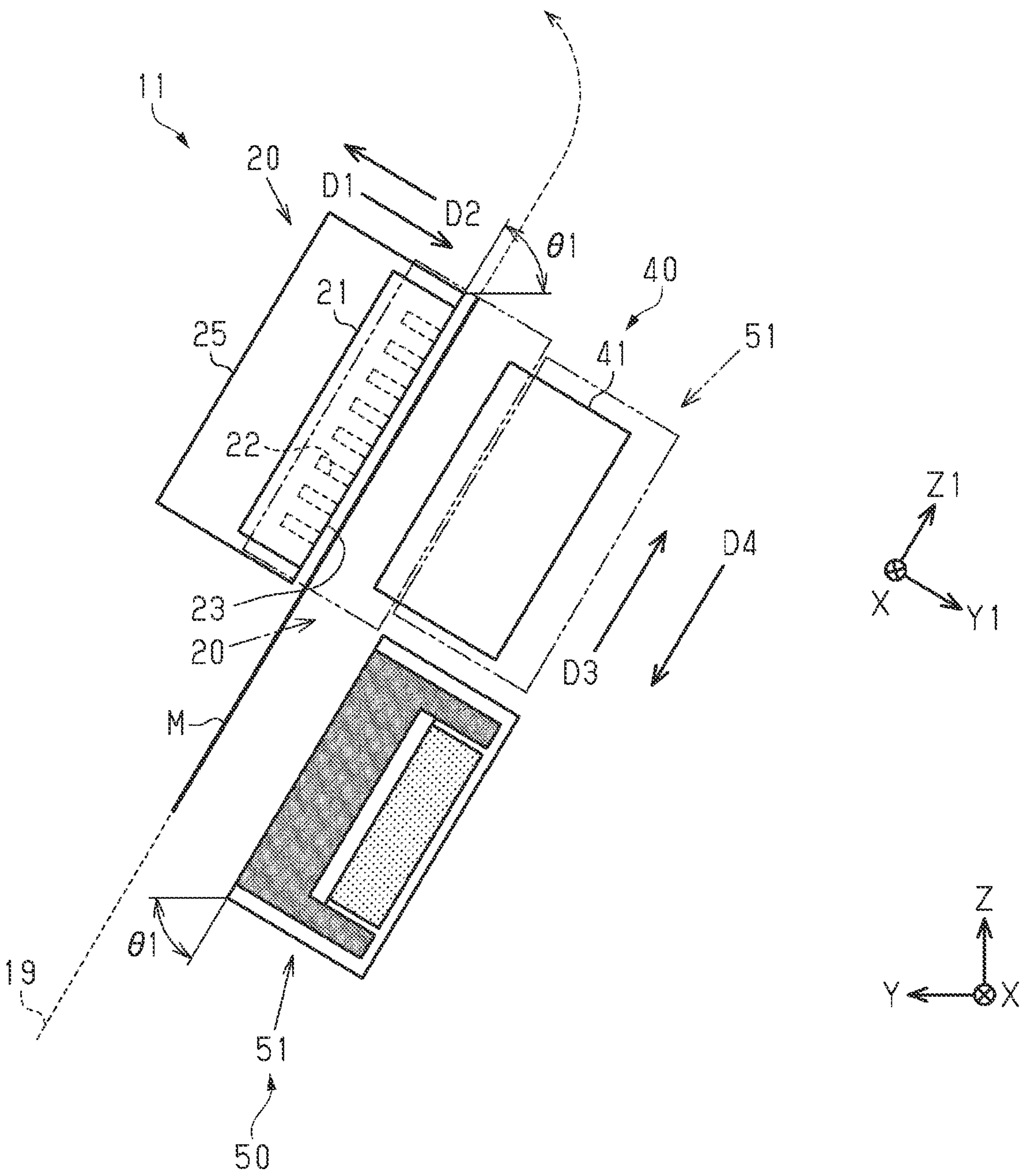
FIG. 2 is a schematic diagram illustrating disposition of components around a liquid discharge head.

As illustrated in FIG. 2, around a liquid discharge head 21 included in the liquid discharge portion 20, a cap 51 included in a cap apparatus 50 and a wiper 41 included in a wiper apparatus 40 are disposed on a side opposite to the side on which the liquid discharge portion 20 is positioned with respect to the transport path 19. The liquid discharge portion 20 includes the liquid discharge head 21 and a support portion 25 that holds the liquid discharge head 21.

The liquid discharge head 21 is configured to discharge ink to the medium M from a plurality of nozzles 22 constituting the plurality of nozzle groups in a state of extending in the X-axis direction. When the liquid discharge head 21 discharges ink to the medium M, the direction in which the ink is discharged is referred to as a discharge direction Y1. Further, when the liquid discharge head 21 discharges ink to the medium M, the direction in which the medium M is transported is referred to as a first transport direction Z1.

In the present embodiment, a nozzle surface 23 on which the nozzle 22 is disposed is not horizontal and has a first predetermined angle θ1 with respect to the horizontal. That is, in the present embodiment, the liquid discharge head 21 is disposed in a state in which the nozzle surface 23 has the first predetermined angle θ1 with respect to the horizontal, and the liquid discharge head 21 discharges ink to the medium M in the state. The nozzle surface 23 on which the nozzle 22 is disposed may be horizontally disposed. That is, the liquid discharge head 21 may be disposed in a state in which the nozzle surface 23 is in a horizontal state.

The liquid discharge head 21 of the present embodiment is a line head having a number of the nozzles 22 that is configured to simultaneously discharge ink over the entire width of the medium M in the X-axis direction intersecting the first transport direction Z1 and the discharge direction Y1. The liquid discharge apparatus 11 performs line printing by discharging ink from the plurality of nozzles 22, which is positioned at positions facing the entire width of the medium M, toward the medium M transported at a constant speed.

In the liquid discharge apparatus 11, a maintenance operation related to the liquid discharge portion 20, such as capping, cleaning, flushing, or wiping, is performed to prevent or eliminate a discharge failure caused by clogging of the nozzle 22 of the liquid discharge head 21, adhesion of foreign matter, and the like.

The capping refers to an operation in which the cap 51 comes into contact with the nozzle surface 23 of the liquid discharge head 21 and forms a capping space CS in which the nozzle 22 opens when the liquid discharge head 21 does not perform the discharge of liquid. Since the thickening of the liquid in the nozzle 22 is suppressed by the capping, the occurrence of discharge failure can be prevented. The capping space CS is an example of a closed space.

The cleaning refers to an operation in which the ink is forcibly discharged from the nozzle 22 by pressurizing upstream of the liquid supplied to the liquid discharge head 21 in the supply direction, or the ink is forcibly discharged from the nozzle 22 by applying a suction force to the nozzle 22 of the liquid discharge head 21.

The flushing refers to a discharge operation for discharging liquid droplets unrelated to recording from the nozzle 22. The flushing also refers to empty discharge. By the flushing, the thickening ink, air bubbles, or foreign matter that cause discharge failure are discharged from the nozzle 22, so that clogging of the nozzle 22 can be prevented. Of the liquid discharged from the liquid discharge head 21, ink that is not used for recording is referred to as a waste liquid L2 (see FIG. 4). The liquid discharged by the flushing is the waste liquid L2 because the liquid is not used for recording. The waste liquid L2 discharged by the flushing is received by the cap 51. That is, the liquid discharge head 21 discharges the liquid droplets from the nozzle 22 toward the inside of the cap 51, so that the flushing is performed.

The wiping refers to an operation of wiping the nozzle surface 23 with a rubber wiper, a cloth wiper, and the like. By the wiping, dirt such as ink and dust adhering to the nozzle surface 23 of the liquid discharge head 21 is removed. Since the ink wiped by the wiping is not used for recording, the ink is also the waste liquid L2.

The position of the liquid discharge portion 20 when the liquid discharge head 21 discharges ink to the medium M, that is, when the liquid discharge head 21 performs recording on the medium M is referred to as a recording position. Further, the position of the cap 51 when the liquid discharge head 21 discharges ink to the medium M is referred to as a retracted position. Further, the position of the liquid discharge portion 20 when the liquid discharge apparatus 11 performs the maintenance operation related to the liquid discharge portion 20 is referred to as a maintenance position. The position of the cap 51 when the liquid discharge apparatus 11 performs the maintenance operation related to the liquid discharge portion 20 is also referred to as a maintenance position.

The cap 51 is moved between the retracted position indicated by a solid line in FIG. 2 and the maintenance position indicated by a two-dot chain line in FIG. 2 by a cap movement mechanism (not illustrated). The direction in which the cap 51 moves from the retracted position to the maintenance position is referred to as a third direction D3. The direction in which the cap 51 moves from the maintenance position to the retracted position is referred to as a fourth direction D4.

As illustrated in FIG. 2, after the cap 51 moves from the retracted position indicated by the solid line in FIG. 2 in the third direction D3 and is positioned at the maintenance position indicated by the two-dot chain line in FIG. 2, the liquid discharge portion 20 moves from the recording position indicated by the solid line in FIG. 2 in the first direction D1, and is positioned at the maintenance position indicated by the two-dot chain line in FIG. 2. As a result, the liquid discharge portion 20 is capped by the cap 51. In the present embodiment, in the capping state, the liquid discharge head 21 discharges the liquid droplets from the nozzle 22 toward the inside of the cap 51, so that the flushing is performed. That is, in the liquid discharge apparatus 11 of the present embodiment, both the capping and the flushing are performed at the maintenance position. The flushing may be performed in a state in which the liquid discharge head 21 is separated from the cap 51.

The wiper 41 moves in a direction along the X-axis by driving a wiper movement mechanism (not illustrated) included in the wiper apparatus 40. In a state where the liquid discharge portion 20 is positioned at the maintenance position illustrated by a two-dot chain line in FIG. 2, the wiper 41 moves in the −X direction from a standby position on the side of the +X direction of the liquid discharge portion 20 to a folded-back position on the side of the −X direction of the liquid discharge portion 20. As a result, the nozzle surface 23 of the liquid discharge head 21 is wiped by the wiper 41. When the wiping ends, the liquid discharge portion 20 moves from the maintenance position in the second direction D2 and is positioned at the recording position indicated by the solid line in FIG. 2. After the above-mentioned, the wiper 41 moves from the folded-back position in the +X direction and is positioned at the standby position.

When the maintenance ends, the liquid discharge portion 20 moves from the maintenance position indicated by the two-dot chain line in FIG. 2 in the second direction D2, and is positioned at the recording position indicated by the solid line in FIG. 2. After the above-mentioned, the cap 51 moves from the maintenance position indicated by the two-dot chain line in FIG. 2 in the fourth direction D4, and is positioned at the retracted position indicated by the solid line in FIG. 2. At this time, the wiper 41 is positioned at a position in which the wiper 41 does not overlap the liquid discharge portion 20 and the cap 51 in the X-axis direction.

Figure 4:
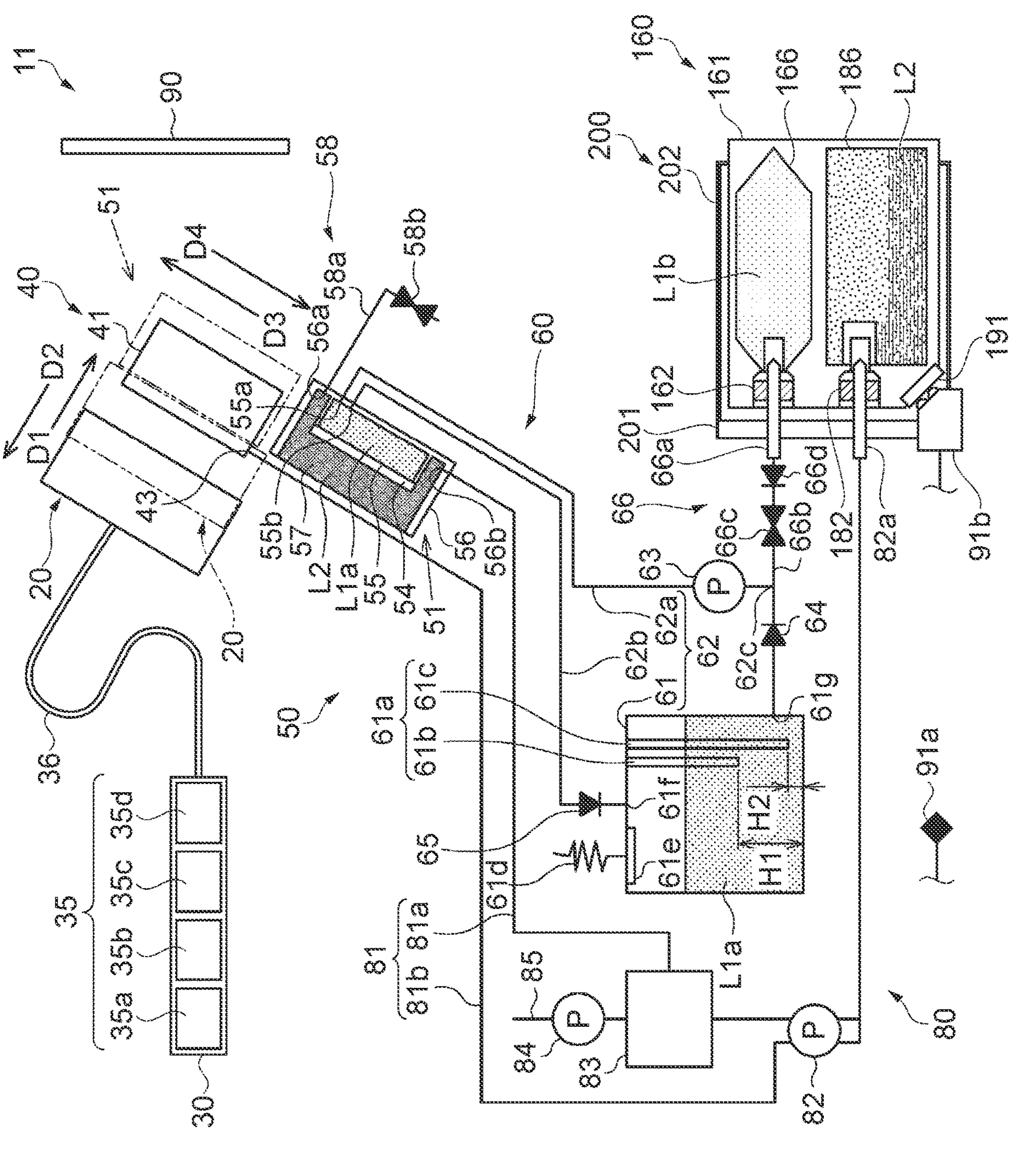
FIG. 4 is a schematic diagram illustrating a configuration of a cap apparatus.

As illustrated in FIG. 4, the liquid discharge apparatus 11 includes the liquid accommodating body mounting portion

30, the cap apparatus 50, the accommodating body mounting portion 200 to which the accommodating body 160 accommodating a concentration adjusting liquid L1*b* can be mounted, a temperature sensor 91*a*, and a control portion 90, in the main body 12.

A liquid accommodating body 35 that accommodates ink discharged by the liquid discharge portion 20 is detachably mounted on the liquid accommodating body mounting portion 30. The liquid accommodating body 35 of the present embodiment includes liquid accommodating bodies 35*a*, 35*b*, 35*c*, and 35*d*. Each of the liquid accommodating bodies 35*a*, 35*b*, 35*c*, and 35*d* accommodates any one of black ink, cyan ink, magenta ink, and yellow ink as an example of ink. The ink accommodated in each of the liquid accommodating bodies 35*a*, 35*b*, 35*c*, and 35*d* is supplied to the liquid discharge portion 20 via a supply tube 36.

The cap apparatus 50 includes the cap 51, a cap movement mechanism (not illustrated), a moisturizing liquid circulation mechanism 60, and a waste liquid collecting mechanism 80.

As illustrated in FIG. 4, the cap 51 included in the cap apparatus 50 has a first moisture permeable film 54, a humidifying chamber 55, a case 56, and a recess portion 57.

The first moisture permeable film 54 partitions the internal space of the case 56 into the recess portion 57 and the humidifying chamber 55. The first moisture permeable film 54 is a sheet-like member having gas permeability. The first moisture permeable film 54 allows the passage of the gas, but restricts the passage of the liquid. In the present embodiment, the material used for the first moisture permeable film 54 is a material obtained by coating a fabric with a fluorine resin. The material used for the first moisture permeable film 54 may be any material that does not allow liquid to pass through but allows gas to pass through, and may be a film membrane or an elastomer membrane.

In the case 56, the humidifying chamber 55 and the recess portion 57 are provided by partitioning the internal space of the case 56 by the first moisture permeable film 54. An absorber that is configured to hold the waste liquid L2 discharged from the liquid discharge head 21 is disposed in the recess portion 57. When the cap 51 caps the liquid discharge portion 20, the case 56 comes into contact with the nozzle surface 23 of the liquid discharge head 21. At this time, the recess portion 57 forms a capping space CS surrounding the opening of the nozzle 22.

In the recess portion 57 of the case 56, an atmospheric communication hole 56*a* that is configured to communicate the capping space CS formed by the recess portion 57 with the atmosphere is disposed. Further, in the recess portion 57 of the case 56, a discharge hole 56*b* that is configured to discharge the waste liquid L2 discharged from the liquid discharge head 21 from the cap 51 is disposed.

The humidifying chamber 55 has an inflow port 55*a* into which a moisturizing liquid L1*a* described later flows to moisturize the capping space CS formed by the recess portion 57 and an outflow port 55*b* out which the moisturizing liquid L1*a* flows, via the first moisture permeable film 54. Since the first moisture permeable film 54 does not have liquid permeability, the first moisture permeable film 54 restricts the passage of the liquid in the humidifying chamber 55 to the recess portion 57. As a result, in the humidifying chamber 55, the liquid that has flowed in from the inflow port 55*a* flows out from the outflow port 55*b*.

As illustrated in FIG. 4, the moisturizing liquid circulation mechanism 60 included in the cap apparatus 50 includes a moisturizing liquid accommodating portion 61 that accommodates the moisturizing liquid L1*a* moisturizing the cap 51, a supply flow path 62*a*, and a circulation path 62 that includes a return flow path 62*b*. The supply flow path 62*a* communicates the moisturizing liquid accommodating portion 61 with the inflow port 55*a* of the cap 51. That is, the supply flow path 62*a* communicates the moisturizing liquid accommodating portion 61 with the cap 51. The return flow path 62*b* communicates the outflow port 55*b* with the moisturizing liquid accommodating portion 61. That is, the return flow path 62*b* communicates the cap 51 with the moisturizing liquid accommodating portion 61.

The moisturizing liquid accommodating portion 61 has an inflow portion 61*f* and an outflow portion 61*g*. The moisturizing liquid accommodating portion 61 communicates with the return flow path 62*b* in the inflow portion 61*f*. The moisturizing liquid accommodating portion 61 communicates with the supply flow path 62*a* in the outflow portion 61*g*.

In the moisturizing liquid circulation mechanism 60, the moisturizing liquid L1*a* flowing in the circulation path 62 is the liquid containing moisture for moisturizing the capping space CS formed by the recess portion 57. It is desirable that the moisturizing power of the moisturizing liquid L1*a* is equal to the moisturizing power of the ink discharged from the liquid discharge head 21. The moisturizing power is a concentration of a moisturizing agent contained in the moisturizing liquid L1*a* and the ink discharged from the liquid discharge head 21. For example, when the liquid discharge head 21 discharges ink to a medium such as paper for recording, it is desirable that the moisturizing power of the moisturizing liquid L1*a* is equal to the moisturizing power of the ink accommodated in the liquid accommodating body 35 within an expiration date. Further, it is desirable that the moisturizing power of the ink is balanced for each color.

The moisturizing liquid accommodating portion 61 accommodates the moisturizing liquid L1*a* containing moisture for moisturizing the capping space CS formed by the recess portion 57. The moisturizing liquid accommodating portion 61 has a liquid amount detecting portion 61*a* that detects the liquid amount of the moisturizing liquid L1*a* accommodated in the moisturizing liquid accommodating portion 61 by detecting the liquid surface of the moisturizing liquid L1*a* in the moisturizing liquid accommodating portion 61. The liquid amount detecting portion 61*a* has a first electrode 61*b* and a second electrode 61*c*.

The moisturizing liquid L1*a* contains pure water as a main component and contains a conductive additive. The moisturizing liquid L1*a* may contain an antiseptic, a surfactant, and the like. The liquid amount detecting portion 61*a* detects the liquid surface of the moisturizing liquid L1*a* in the moisturizing liquid accommodating portion 61 by the electric resistance between the first electrode 61*b* and the second electrode 61*c*. When the liquid surface height of the moisturizing liquid L1*a* accommodated in the moisturizing liquid accommodating portion 61 is higher than a first predetermined height H1, which is an example of a "predetermined height", conduction is established between the first electrode 61*b* and the second electrode 61*c*. When the liquid surface height of the moisturizing liquid L1*a* accommodated in the moisturizing liquid accommodating portion 61 is lower than the first predetermined height H1 and higher than a second predetermined height H2, conduction is not established between the first electrode 61*b* and the second electrode 61*c*. As described above, the liquid amount detecting portion 61*a* is configured to be capable of determining whether or not the liquid surface height of the moisturizing liquid L1*a* is higher than the first predetermined height H1 by the change of the output level of the liquid amount detecting portion 61*a* depending on whether the first electrode 61*b* is in contact with the liquid surface or not.

When the liquid surface height of the moisturizing liquid L1*a* is detected by the liquid amount detecting portion 61*a* to exceed the first predetermined height H1, the moisturizing liquid L1*a* is sufficiently accommodated in the moisturizing liquid accommodating portion 61, that is, it means that the moisturizing liquid accommodating portion 61 is in a full state with the moisturizing liquid L1*a*. In the present embodiment, a full state of the moisturizing liquid accommodating portion 61 is detected. Not only the full state of the moisturizing liquid accommodating portion 61 is detected, but also an empty state or a near-empty state of the moisturizing liquid accommodating portion 61 may be detected. Further, the method of detecting the liquid surface is not limited to the electrode method, and may be an optical method or an electrostatic capacitance method.

The moisturizing liquid accommodating portion 61 has a second atmospheric communication passage 61*d* and a second moisture permeable film 61*e*. The second atmospheric communication passage 61*d* communicates the moisturizing liquid accommodating portion 61 with the atmosphere. The second atmospheric communication passage 61*d* has a maze-shaped thin tube structure. The maze-shaped thin tube structure refers to a tube structure having a complicated path in which air can enter and exit but in which the conduit line is thin and meandering to such an extent that the ingress and egress of liquid are considerably restricted. The evaporation of the liquid in the moisturizing liquid accommodating portion 61 is suppressed by the maze-shaped thin tube structure.

The second moisture permeable film 61*e* is provided at a coupling portion between the moisturizing liquid accommodating portion 61 and the second atmospheric communication passage 61*d*. Further, the second moisture permeable film 61*e* allows the passage of gas from the inside of the moisturizing liquid accommodating portion 61 to the second atmospheric communication passage 61*d*, but restricts the passage of liquid from the inside of the moisturizing liquid accommodating portion 61 to the second atmospheric communication passage 61*d*. In order to increase the efficiency of gas passing from the inside of the moisturizing liquid accommodating portion 61 to the second atmospheric communication passage 61*d*, it is desirable that the area of the second moisture permeable film 61*e* is large.

The moisturizing liquid circulation mechanism 60 includes a first pump 63, a first check valve 64, and a pressure adjusting valve 65. The first pump 63 causes the fluid to flow in the circulation path 62. By driving the first pump 63, the liquid flowing in the supply flow path 62*a* is sent to the humidifying chamber 55 in the cap 51. The first pump 63 is an example of a pump that is configured to flow the moisturizing liquid L1*a* in the circulation path 62.

The first check valve 64 allows the liquid to flow from the side of the moisturizing liquid accommodating portion 61 to the side of the cap 51, and prevents the backflow of the liquid from the side of the cap 51 to the side of the moisturizing liquid accommodating portion 61 due to the water head difference. An open/close valve may be provided instead of the first check valve 64. By driving the first pump 63 when the open/close valve is opened, the liquid may flow from the side of the moisturizing liquid accommodating portion 61 to the side of the cap 51. Opening the valve of the open/close valve is referred to as the valve opening or opening the valve. Further, closing the valve of the open/close valve is referred to as the valve closing or closing the valve.

When the side of the moisturizing liquid accommodating portion 61 reaches a predetermined negative pressure, the pressure adjusting valve 65 allows the liquid to flow from the side of the cap 51 to the side of the moisturizing liquid accommodating portion 61 and always prevents the backflow of the liquid from the side of the moisturizing liquid accommodating portion 61 to the side of the cap 51. The pressure difference of the water head difference is adjusted by the pressure adjusting valve 65 such that the liquid does not flow from the side of the cap 51 to the side of the moisturizing liquid accommodating portion 61 due to the water head pressure.

The moisturizing liquid circulation mechanism 60 includes an adjusting liquid supply portion 66 that is configured to supply the concentration adjusting liquid L1*b*, which is accommodated in an adjusting liquid accommodating portion 166 of the accommodating body 160, into the circulation path 62. The adjusting liquid supply portion 66 includes an outlet pipe 66*a*, an adjusting liquid supply flow path 66*b*, a first open/close valve 66*c*, which is an example of an open/close valve, and a second check valve 66*d*. The outlet pipe 66*a* couples the adjusting liquid accommodating portion 166 to the adjusting liquid supply flow path 66*b*. The adjusting liquid supply flow path 66*b* communicates with the circulation path 62. The first open/close valve 66*c* is configured to be capable of opening and closing the adjusting liquid supply flow path 66*b*.

The outlet pipe 66*a* is disposed in a coupling wall 201 of the accommodating body mounting portion 200. The accommodating body 160 is mounted on the accommodating body mounting portion 200, so that the outlet pipe 66*a* enters an outlet 162 of the adjusting liquid accommodating portion 166 included in the accommodating body 160. As a result, the adjusting liquid accommodating portion 166 communicates with the adjusting liquid supply flow path 66*b*. The adjusting liquid supply flow path 66*b* communicates with the circulation path 62 at a first merging portion 62*c* of the circulation path 62. That is, the adjusting liquid accommodating portion 166 communicates with the circulation path 62 via the outlet pipe 66*a*.

The concentration adjusting liquid L1*b* supplied from the adjusting liquid accommodating portion 166 into the circulation path 62 is a liquid for replenishing the moisture evaporated from the moisturizing liquid L1*a*. The concentration adjusting liquid L1*b* is composed of pure water and a small amount of antiseptics. The ratio of pure water to the concentration adjusting liquid L1*b* may be higher than the ratio of pure water to the moisturizing liquid L1*a*. The concentration adjusting liquid L1*b* is an example of an adjusting liquid.

By opening the first open/close valve 66*c*, the adjusting liquid accommodating portion 166 and the circulation path 62 communicate with each other through the adjusting liquid supply flow path 66*b*. The second check valve 66*d* allows the liquid to flow from the side of the adjusting liquid accommodating portion 166 to the side of the circulation path 62, and prevents the backflow of the liquid from the side of the circulation path 62 to the side of the adjusting liquid accommodating portion 166 due to the water head difference. The second check valve 66*d* may not be provided. When the second check valve 66*d* is not provided, the first pump 63 may cause the concentration adjusting liquid L1*b* to flow from the side of the adjusting liquid accommodating portion 166 to the side of the cap 51 by driving the first pump 63 when the first open/close valve 66*c* is opened.

As illustrated in FIG. 4, the waste liquid collecting mechanism 80 included in the cap apparatus 50 has a waste liquid collecting path 81, an introduction pipe 82*a*, a third pump 82, a buffer chamber 83, a fourth pump 84, and a third atmospheric communication passage 85.

The waste liquid collecting path 81 includes a first waste liquid collecting path 81*a* and a second waste liquid collecting path 81*b*. The first waste liquid collecting path 81*a* communicates with the capping space CS formed by the recess portion 57 of the cap 51 in the discharge hole 56*b* of the cap 51. Then, the first waste liquid collecting path 81*a* communicates the capping space CS with the introduction pipe 82*a* through the buffer chamber 83. Further, the second waste liquid collecting path 81*b* communicates with the wiper 41 in a waste liquid receiving portion outflow port 43 provided in the wiper 41. Then, the second waste liquid collecting path 81*b* communicates the wiper 41 with the introduction pipe 82*a*.

The introduction pipe 82*a* couples a waste liquid accommodating portion 186 provided in the accommodating body 160 to the waste liquid collecting path 81. The introduction pipe 82*a* is disposed on the coupling wall 201 of the accommodating body mounting portion 200. The accommodating body 160 is mounted on the accommodating body mounting portion 200, so that the introduction pipe 82*a* enters the introduction port 182 of the waste liquid accommodating portion 186 included in the accommodating body 160. As a result, the waste liquid accommodating portion 186 communicates with the waste liquid collecting path 81 via the introduction pipe 82*a*.

At the time of the flushing, the cleaning, and the like, ink is discharged as the waste liquid L2 from the nozzle 22 of the liquid discharge head 21. The waste liquid L2 is collected from the inside of the cap 51 and flows to the first waste liquid collecting path 81*a*. Further, at the time of the wiping, the ink adhering to the nozzle surface 23 of the liquid discharge head 21 is wiped off and collected in the wiper 41 as the waste liquid L2. The waste liquid L2 is collected from the wiper 41 and flows to the second waste liquid collecting path 81*b*. The waste liquid L2 collected by the flushing or the cleaning and the waste liquid L2 collected by the wiping are sent to the waste liquid accommodating portion 186 by the third pump 82. Then, the waste liquid L2 is accommodated in the waste liquid accommodating portion 186.

The fourth pump 84 of the present embodiment is a decompression pump. The fourth pump 84 lowers the air pressure in the buffer chamber 83 by discharging the air in the buffer chamber 83 to the outside of the buffer chamber 83 through the third atmospheric communication passage 85. As a result, the waste liquid L2 discharged from the nozzle 22 of the liquid discharge head 21 to the recess portion 57 of the cap 51 during the flushing or the cleaning easily flows into the buffer chamber 83 through the first waste liquid collecting path 81*a*. The buffer chamber 83, the fourth pump 84, and the third atmospheric communication passage 85 may not be provided.

The cap 51 has an atmosphere opening mechanism 58. The atmosphere opening mechanism 58 has a first atmospheric communication passage 58*a* and a third open/close valve 58*b*.

The first atmospheric communication passage 58*a* communicates the atmosphere with the atmospheric communication hole 56*a* provided in the recess portion 57 in the cap 51. The third open/close valve 58*b* is an open/close valve that is configured to open and close the first atmospheric communication passage 58*a*. In the present embodiment, the side of the atmosphere of the first atmospheric communication passage 58*a* is open. Then, when the cap 51 moves from the maintenance position indicated by the two-dot chain line in FIG. 4 to be positioned at the retracted position indicated by the solid line in FIG. 4 in the fourth direction D4, the cap apparatus 50 is configured such that the released portion hits a wall (not illustrated) and the wall closes the first atmospheric communication passage 58*a*. That is, the third open/close valve 58*b* is closed or opened by the movement of the cap 51. At the time of the flushing or the cleaning, the liquid discharge head 21 discharges ink to the recess portion 57 of the cap 51 in a state in which the first atmospheric communication passage 58*a* is open.

Next, the accommodating body 160 will be described. As illustrated in FIG. 4, the accommodating body 160 has the adjusting liquid accommodating portion 166, the waste liquid accommodating portion 186, a circuit substrate 191, and a casing 161.

The adjusting liquid accommodating portion 166 is disposed in the casing 161 to be configured to accommodate the concentration adjusting liquid L1*b* that adjusts the concentration of the moisturizing liquid L1*a*. The adjusting liquid accommodating portion 166 is a bag body with flexibility. The adjusting liquid accommodating portion 166 has the outlet 162 that is configured to flow out the concentration adjusting liquid L1*b* to be accommodated.

The waste liquid accommodating portion 186 is disposed in the casing 161 that is configured to accommodate the waste liquid L2. The waste liquid accommodating portion 186 is configured with an absorber that absorbs a liquid and can hold the absorbed liquid, for example, a sponge-like porous member, a stacked body in which waste paper is stacked, and the like. The accommodating body 160 has the introduction port 182 that is configured to introduce the waste liquid L2 into the absorber.

The circuit substrate 191 has a storage portion. The storage portion of the circuit substrate 191 stores the manufacturing number of the accommodating body 160, the remaining amount of the concentration adjusting liquid L1*b* accommodated in the accommodating body 160, the holding amount of the waste liquid L2 accommodated in the waste liquid accommodating portion 186, and the information such as the history in which the accommodating body 160 has been previously mounted on the accommodating body mounting portion 200, and the year, month, date, and time at that time. When the accommodating body 160 is mounted on the accommodating body mounting portion 200, the circuit substrate 191 is disposed in the casing 161 such that the control portion 90 can access the information stored in the storage portion of the circuit substrate 191. In the present embodiment, when the accommodating body 160 is mounted on the accommodating body mounting portion 200, the circuit substrate 191 is disposed in the casing 161 to be in contact with a replacement detecting portion 91*b* described later.

Figure 12:
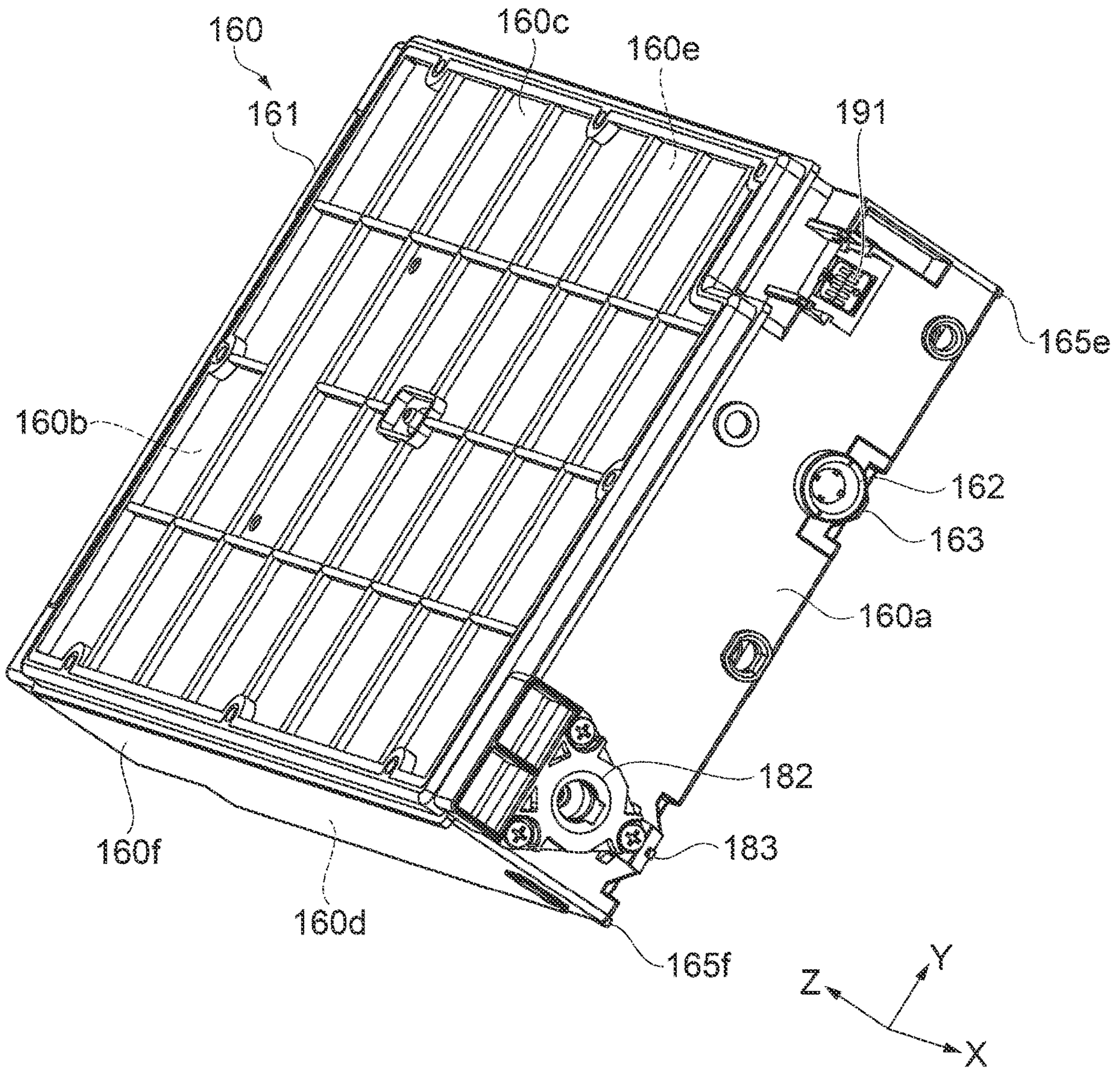
FIG. 12 is a perspective view of the accommodating body.
Figure 13:
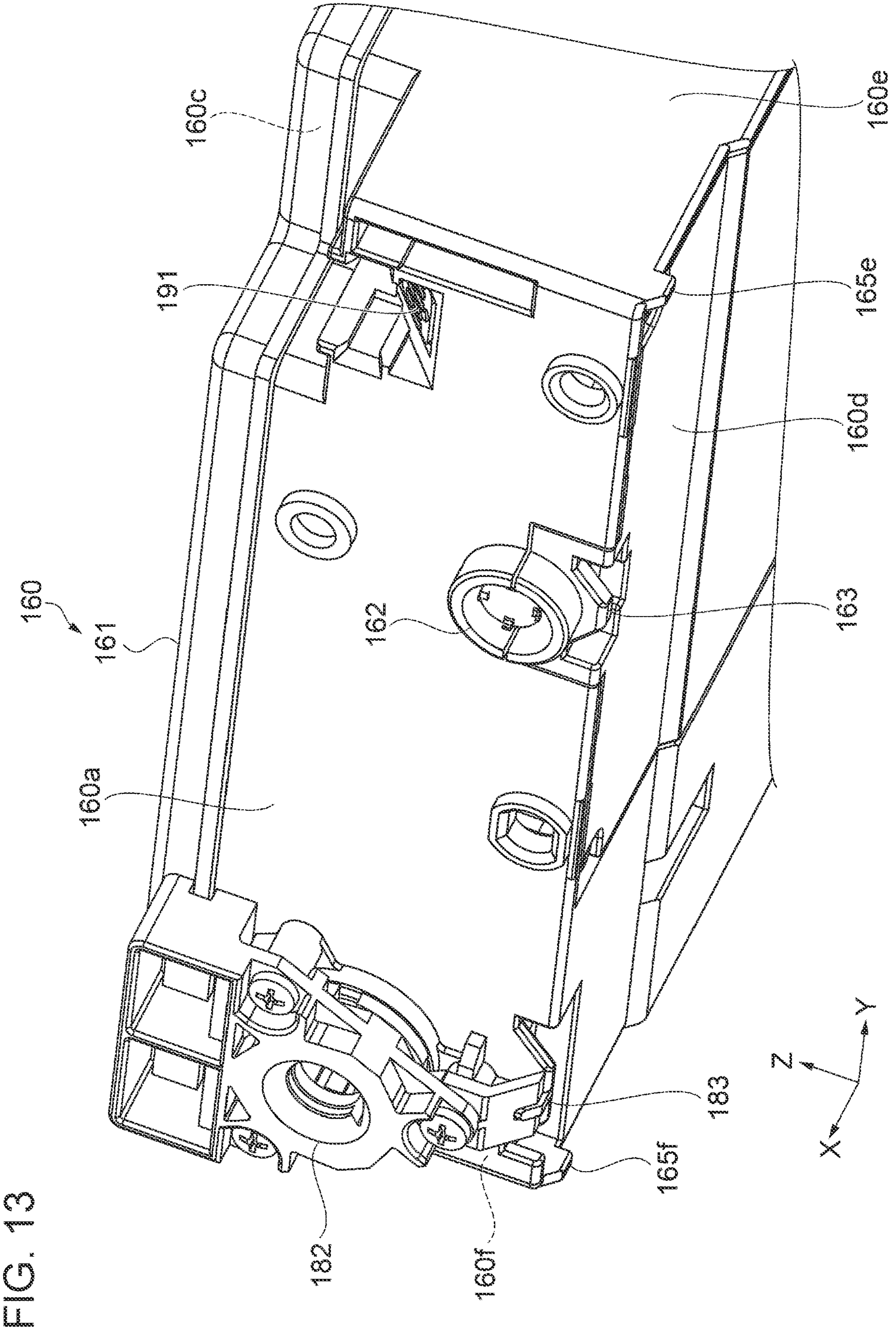
FIG. 13 is a partial perspective view illustrating components around a front wall of the accommodating body.

As illustrated in FIGS. 12 and 13, the casing 161 has a front wall 160*a*, a rear wall 160*b*, an upper wall 160*c*, a bottom wall 160*d*, and side walls 160*e* and 160*f*. In FIGS. 12 and 13, the spatial axes X, Y, and Z are illustrated based on the posture of the accommodating body 160 when the accommodating body 160 is mounted on the accommodating body mounting portion 200.

The front wall 160*a* is a wall on the side of the +X direction that is the back side in a mounting direction in which the accommodating body 160 is mounted on the accommodating body mounting portion 200. The rear wall 160*b* is a wall on the side in the −X direction that is the front side in the mounting direction in which the accommodating body 160 is mounted on the accommodating body mounting portion 200. The upper wall 160*c* is a wall on the side of the +Z direction that is upward when the accommodating body 160 is mounted on the accommodating body mounting portion 200. The bottom wall 160*d* is a wall on the side of the −Z direction that is downward when the accommodating body 160 is mounted on the accommodating body mounting portion 200. The side wall 160*e* is a wall positioned on the side of the +Y direction when the accommodating body 160 is mounted on the accommodating body mounting portion 200. The side wall 160*f* is a wall positioned on the side of the −Y direction when the accommodating body 160 is mounted on the accommodating body mounting portion 200.

The outlet 162 of the adjusting liquid accommodating portion 166, the introduction port 182 of the waste liquid accommodating portion 186, and the circuit substrate 191 are disposed on the front wall 160*a* of the casing 161. The outlet 162 is on the side of the −Z direction from the introduction port 182 and the circuit substrate 191 in the Z-axis direction, and is disposed at a position between the introduction port 182 and the circuit substrate 191 in the Y-axis direction. The introduction port 182 is disposed at a position closer to the side wall 160*f* on the side of the −Y direction than the center of the front wall 160*a*. The circuit substrate 191 is attached in an inclined posture in which an end portion on the side of the +X direction, which is the back side in the mounting direction, is in the −Z direction from an end portion on the side of the −X direction, at a position closer to the side wall 160*e* on the side of the +Y direction than the center of the front wall 160*a*.

Further, the guide portion 163 and the guide portion 183 are provided on the front wall 160*a* of the casing 161. The guide portion 163 is continuous from the outlet 162 and extends in the −Z direction below the outlet 162. The guide portion 163 has a convex shape portion protruding in the −Z direction from a portion of the front wall 160*a* adjacent to the guide portion 163 in the Y-axis direction. The guide portion 163 guides the concentration adjusting liquid L1*b* adhering to the outlet 162 toward the convex shape portion. The guide portion 183 is continuous from the introduction port 182 and extends in the −Z direction below the introduction port 182. The guide portion 183 has a convex shape portion protruding in the −Z direction from a portion of the front wall 160*a* adjacent to the guide portion 183 in the Y-axis direction. The guide portion 183 guides the waste liquid L2 adhering to the introduction port 182 toward the convex shape portion.

Further, a protrusion 165*e* is provided at an end on the side of the +X direction, which is an end on the back side in the mounting direction of the side wall 160*e* of the casing 161. The protrusion 165*e* is a protrusion that protrudes in the −Z direction from a portion of the side wall 160*e* that is on the side of the +X direction from the center and a portion of the bottom wall 160*d* that is on the side of the +X direction from the center. Further, a protrusion 165*f* is provided at an end on the side of the +X direction, which is an end on the back side in the mounting direction of the side wall 160*f* of the casing 161. The protrusion 165*f* is a protrusion that protrudes in the −Z direction from a portion of the side wall 160*f* that is on the side of the +X direction from the center and a portion of the bottom wall 160*d* that is on the side of the +X direction from the center.

In the protrusion shapes of the protrusions 165*e* and 165*f*, with respect to a portion on the side of the +X direction, which is the back side in the mounting direction, as illustrated in FIG. 13, the position of an end in the −Z direction, which is the tip of the protrusions 165*e* and 165*f*, is inclined in the direction of the −X direction compared with the position of an end in the +Z direction, which is the base of the protrusions 165*e* and 165*f*.

Next, the accommodating body mounting portion 200 will be described. As illustrated in FIGS. 4, 14 to 17, the accommodating body mounting portion 200 included in the liquid discharge apparatus 11 has the coupling wall 201, a mounting frame 202, a guide portion 203, and a waste liquid tray 204. The coupling wall 201, the mounting frame 202, the guide portion 203, and the waste liquid tray 204 form a mounting space in which the accommodating body 160 is detachably mounted. For the sake of explanation, FIG. 15 illustrates a state in which the coupling wall 201 is removed.

Figure 16:
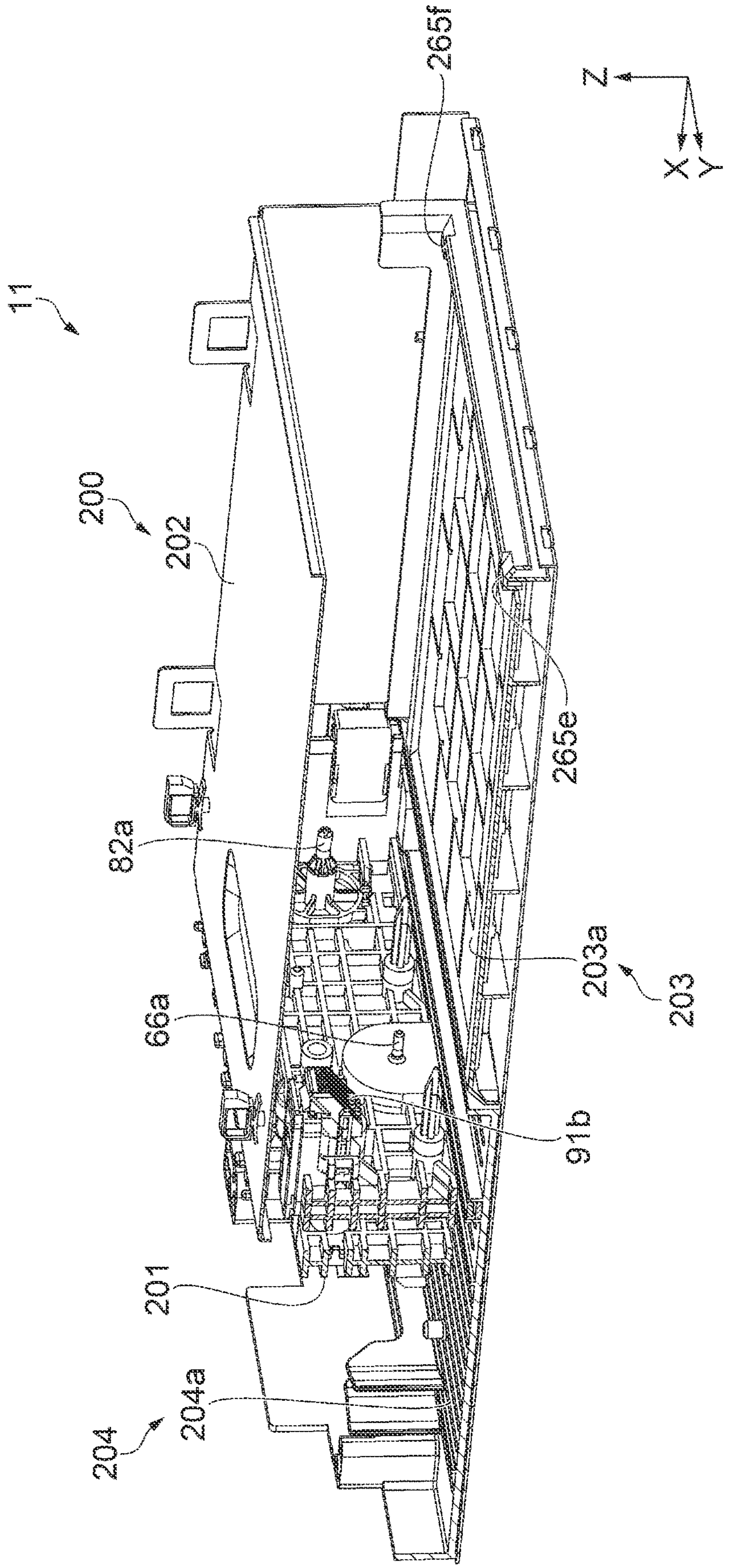
FIG. 16 is a sectional perspective view illustrating the inside of the accommodating body mounting portion.

The coupling wall 201 defines an end of the mounting space on the side of the +X direction. The outlet pipe 66*a*, the introduction pipe 82*a*, and the replacement detecting portion 91*b* are disposed in the coupling wall 201. The outlet pipe 66*a*, the introduction pipe 82*a*, and the replacement detecting portion 91*b* are disposed to protrude from the coupling wall 201 into the mounting space of the accommodating body mounting portion 200. As illustrated in FIG. 16, the outlet pipe 66*a* is positioned between the introduction pipe 82*a* and the replacement detecting portion 91*b* in the Y-axis direction. The introduction pipe 82*a* is positioned on the side of the −Y direction of the outlet pipe 66*a*. The replacement detecting portion 91*b* is disposed on the side of the +Y direction of the outlet pipe 66*a* such that the replacement of the accommodating body 160 mounted on the accommodating body mounting portion 200 can be detected.

As illustrated in FIG. 4, it is assumed that the accommodating body 160 is mounted in the accommodating body mounting portion 200. As a result, the outlet pipe 66*a* enters the outlet 162 of the adjusting liquid accommodating portion 166 included in the accommodating body 160, and communicates the adjusting liquid accommodating portion 166 with the adjusting liquid supply flow path 66*b*. Further, the introduction pipe 82*a* enters the introduction port 182 of the waste liquid accommodating portion 186 included in the accommodating body 160, and communicates the waste liquid accommodating portion 186 with the waste liquid collecting path 81. Further, the replacement detecting portion 91*b* is in contact with the circuit substrate 191 included in the accommodating body 160 and is electrically coupled. The replacement detecting portion 91*b* of the present embodiment is a contact type connector.

Figure 17:
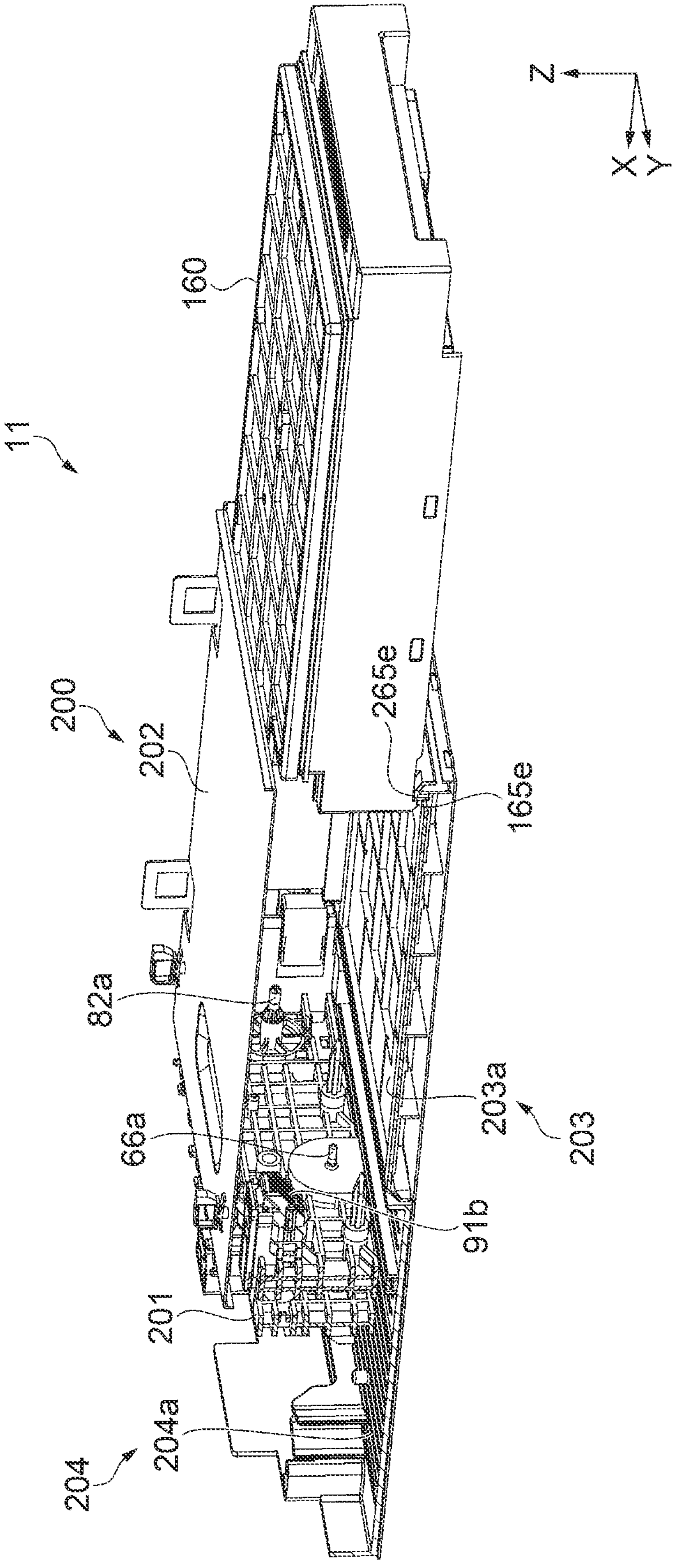
FIG. 17 is a sectional perspective view of the accommodating body mounting portion when the accommodating body is removed.

As illustrated in FIGS. 16 and 17, the guide portion 203 is disposed in a region on the side of the −X direction from the outlet pipe 66*a* and the introduction pipe 82*a* in the X-axis direction. The guide portion 203 defines the side of the −X direction from the outlet pipe 66*a* and the introduction pipe 82*a* among the ends of the mounting space on the side of the −Z direction. The guide portion 203 has a guide 203*a* and restriction portions 265*e* and 265*f*. The guide 203*a* guides the movement of the accommodating body 160 by coming into contact with the bottom wall 160*d* (see FIGS. 12 and 13) of the accommodating body 160 detachable to the accommodating body mounting portion 200.

The restriction portions 265*e* and 265*f* restrict the back side in the mounting direction of the accommodating body 160 and the end portion on the side of the +X direction from coming out of the accommodating body mounting portion 200 by engaging with the protrusions 165*e* and 165*f* (see FIGS. 12 and 13) of the accommodating body 160. The restriction portions 265*e* and 265*f* are provided at positions at both ends in the Y-axis direction in a stepped projection portion provided over the Y-axis direction of the guide portion 203 at the end portion on the side of the −X direction of the guide portion 203. The restriction portion 265*e* is provided at a position, which is an end in the +Y direction of the stepped projection portion, to engage with the protrusion 165*e* of the accommodating body 160. The restriction portion 265*f* is provided at a position, which is an end in the −Y direction of the stepped projection portion, to engage with the protrusion 165*f* of the accommodating body 160.

For example, it is assumed that the user grips the end portion on the side of the −X direction, which is the front side in the mounting direction of the accommodating body 160, with one hand, and pulls out the accommodating body 160 from the accommodating body mounting portion 200 in the −X direction, which is the opposite direction of the mounting direction. Then, as illustrated in FIG. 17, the restriction portions 265*e* and 265*f* engage with the protrusions 165*e* and 165*f* of the accommodating body 160, so that the end portion on the side in the +X direction, which is the back side in the mounting direction of the accommodating body 160, is restricted from coming out of the accommodating body mounting portion 200.

The user releases the engagement between the restriction portions 265*e* and 265*f* and the protrusions 165*e* and 165*f* of the accommodating body 160 by supporting the end portion of the bottom wall 160*d* (see FIGS. 12 and 13) of the accommodating body 160 on the side of the +X direction with the other hand and lifting the accommodating body 160 in the +Z direction with the other hand. As a result, in a state in which the user grips the end portion of the accommodating body 160 on the side of the −X direction with one hand and supports the end portion of the accommodating body 160 on the side of the +X direction with the other hand, the accommodating body 160 is removed from the accommodating body mounting portion 200. According to this, it is easy to suppress the fall of the accommodating body 160 compared with a case where the accommodating body 160 is removed from the accommodating body mounting portion 200 in a state in which the end portion of the accommodating body 160 on the side of the −X direction is gripped with one hand.

Figure 14:
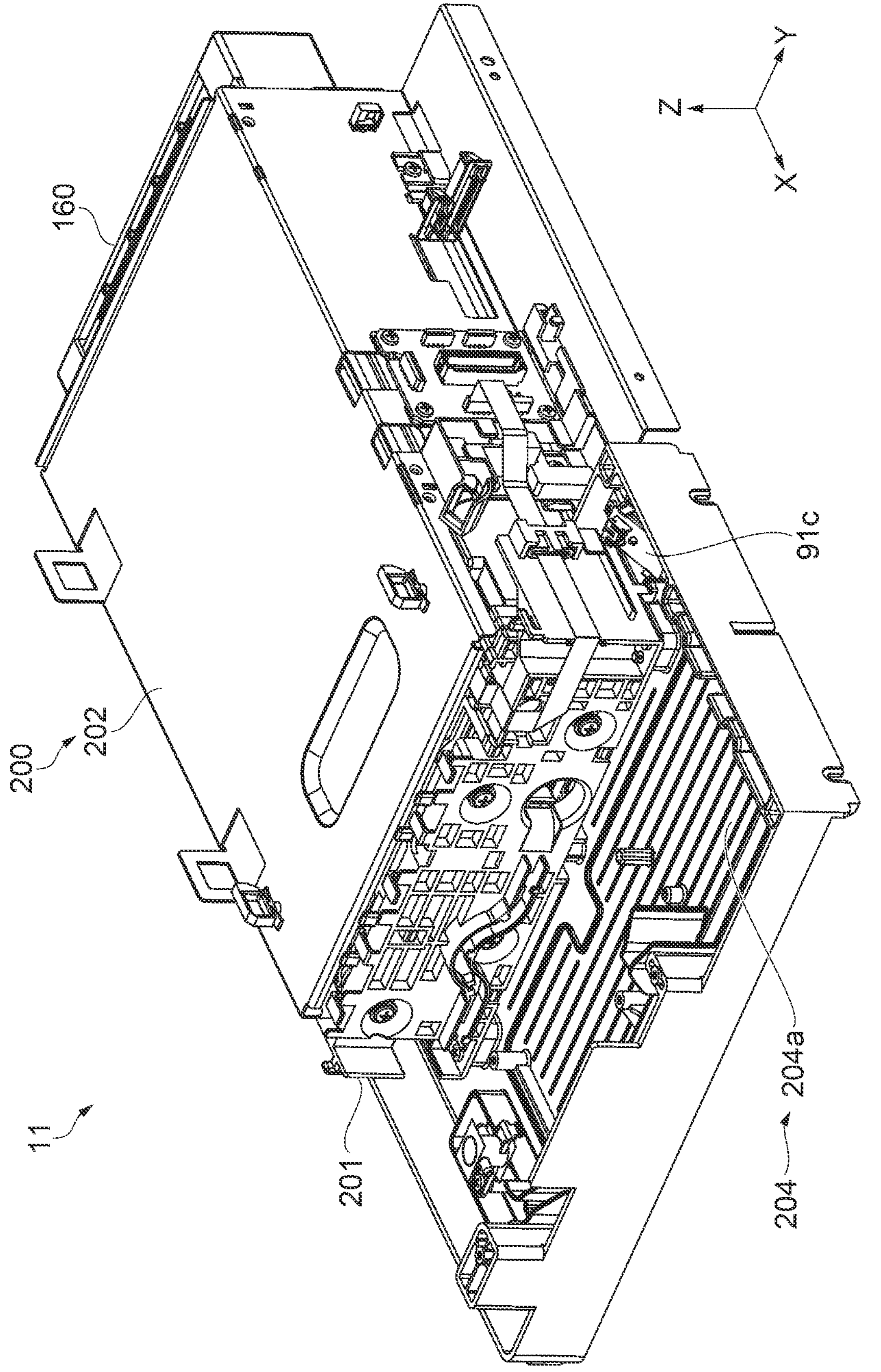
FIG. 14 is a perspective view of an accommodating body mounting portion to which the accommodating body is mounted.
Figure 15:
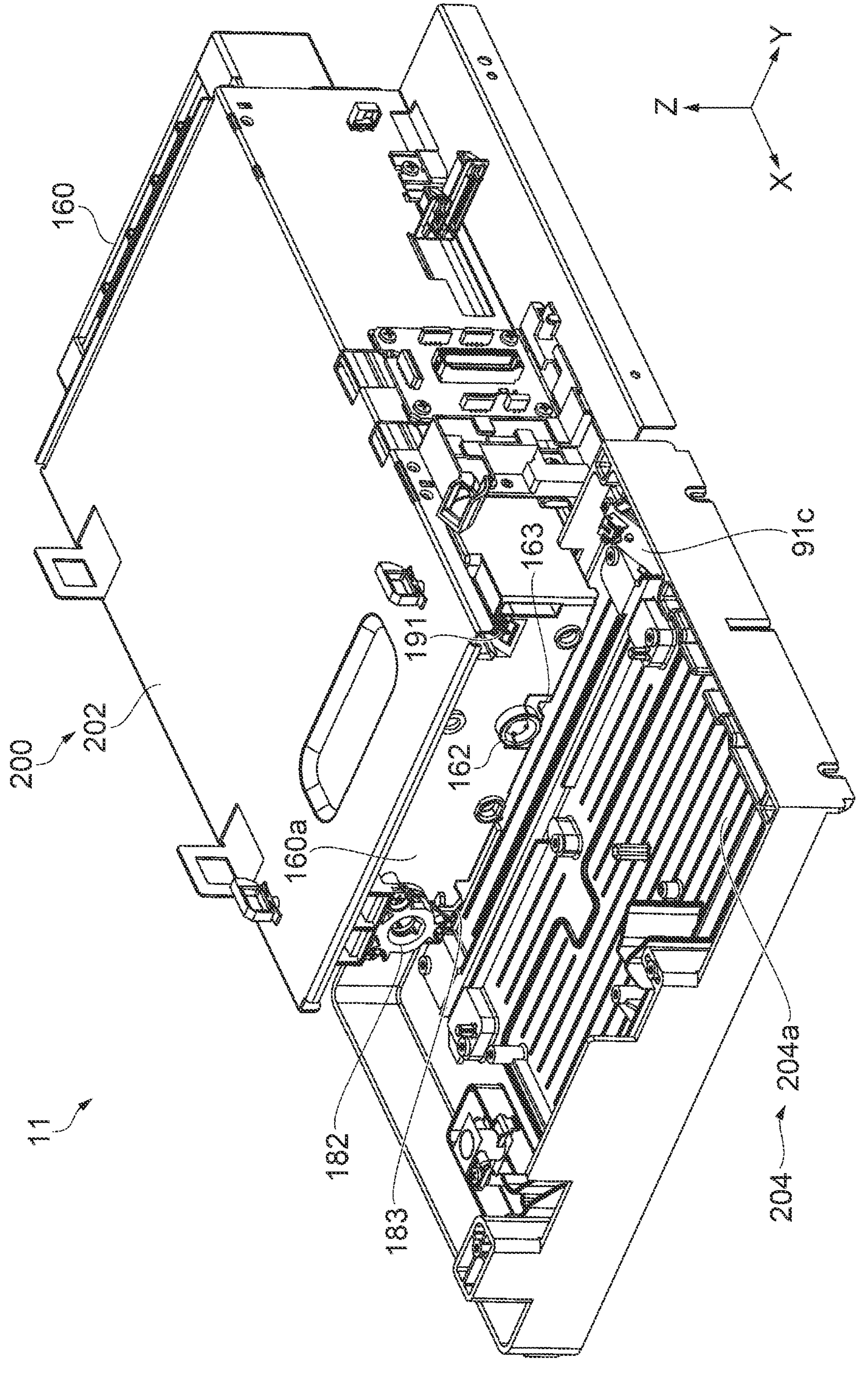
FIG. 15 is a perspective view illustrating the front wall periphery of the accommodating body mounted on the accommodating body mounting portion.

As illustrated in FIGS. 14 to 16, the waste liquid tray 204 defines the side of the +X direction from the outlet pipe 66*a* and the introduction pipe 82*a* among the ends of the mounting space on the side of the −Z direction. The waste liquid tray 204 has a receiving portion 204*a* that accommodates and receives the concentration adjusting liquid Lib that falls from the outlet 162 of the adjusting liquid accommodating portion 166 disposed in the accommodating body 160 via the guide portion 163, and the waste liquid L2 that falls from the introduction port 182 of the waste liquid accommodating portion 186 via the guide portion 183. Therefore, as illustrated in FIG. 16, in the receiving portion 204*a* of the waste liquid tray 204, the outlet pipe 66*a* and the introduction pipe 82*a* are disposed, in the X-axis direction, to be positioned between the end of the receiving portion 204*a* in the +X direction and the end of the receiving portion 204*a* in the −X direction.

As a result, for example, when the accommodating body 160 is mounted on the accommodating body mounting portion 200, the concentration adjusting liquid Lib that falls from the outlet 162 and the waste liquid L2 that falls from the introduction port 182 can be accommodated in the receiving portion 204*a*. Further, when the accommodating body 160 is not mounted on the accommodating body mounting portion 200, the concentration adjusting liquid L1*b* that falls from the outlet pipe 66*a* and the waste liquid L2 that falls from the introduction pipe 82*a* can be accommodated in the receiving portion 204*a*. Further, a liquid amount detecting portion 91*c* is disposed on the waste liquid tray 204. The liquid amount detecting portion 91*c* is a liquid amount sensor that detects that the amount of liquid accommodated in the receiving portion 204*a* has reached a predetermined amount.

As illustrated in FIG. 4, the liquid discharge apparatus 11 includes the temperature sensor 91*a* in the main body 12. The temperature sensor 91*a* of the present embodiment is a temperature/humidity sensor that is configured to measure the temperature and humidity of the atmosphere inside the main body 12. The temperature sensor 91*a* is disposed at a position in which the distance to the cap apparatus 50 is shorter than the distance to the control portion 90. The temperature sensor 91*a* is disposed at a position in which the distance to the accommodating body mounting portion 200 is shorter than the distance to the control portion 90. The temperature sensor 91*a* may be disposed at a position on the side of the −Z direction of the control portion 90.

Figure 5:
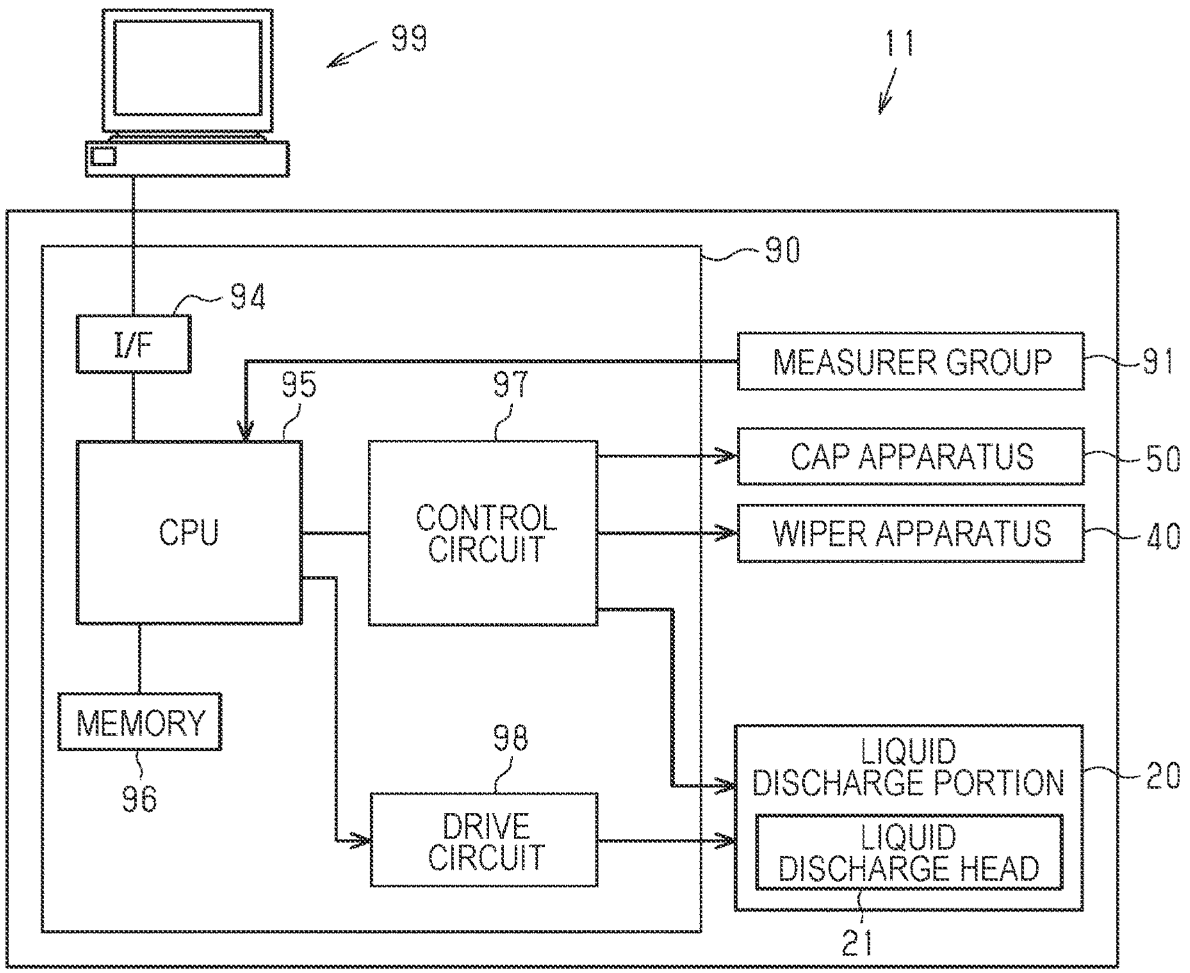
FIG. 5 is a block diagram illustrating an electrical configuration of the liquid discharge apparatus.

Next, the control portion 90 will be described. As illustrated in FIG. 5, the control portion 90 controls the liquid discharge portion 20, the wiper apparatus 40, and the cap apparatus 50. The liquid amount detecting portion 61*a* provided in the cap apparatus 50 is included in a measurer group 91 included in the liquid discharge apparatus 11. The liquid amount detecting portion 61*a* outputs the detecting result to the control portion 90. Further, the temperature sensor 91*a* provided in the main body 12, the replacement detecting portion 91*b* provided in the accommodating body mounting portion 200, and the liquid amount detecting portion 91*c* are included in the measurer group 91 included in the liquid discharge apparatus 11.

The control portion 90 has an interface portion 94, a CPU 95, a memory 96, a control circuit 97, and a drive circuit 98. The interface portion 94 transmits and receives data between the computer 99, which is an external apparatus, and the liquid discharge apparatus 11. The drive circuit 98 generates a drive signal for driving an actuator of the liquid discharge head 21.

The CPU 95 is an arithmetic processing apparatus. The memory 96 is a storage apparatus that secures a region for storing a program of the CPU 95, a work region, and the like, and has a storage element such as a RAM or an EEPROM. The CPU 95 controls the liquid discharge portion 20, the wiper apparatus 40, the cap apparatus 50, and the like via the control circuit 97 according to a program stored in the memory 96.

Figure 6:
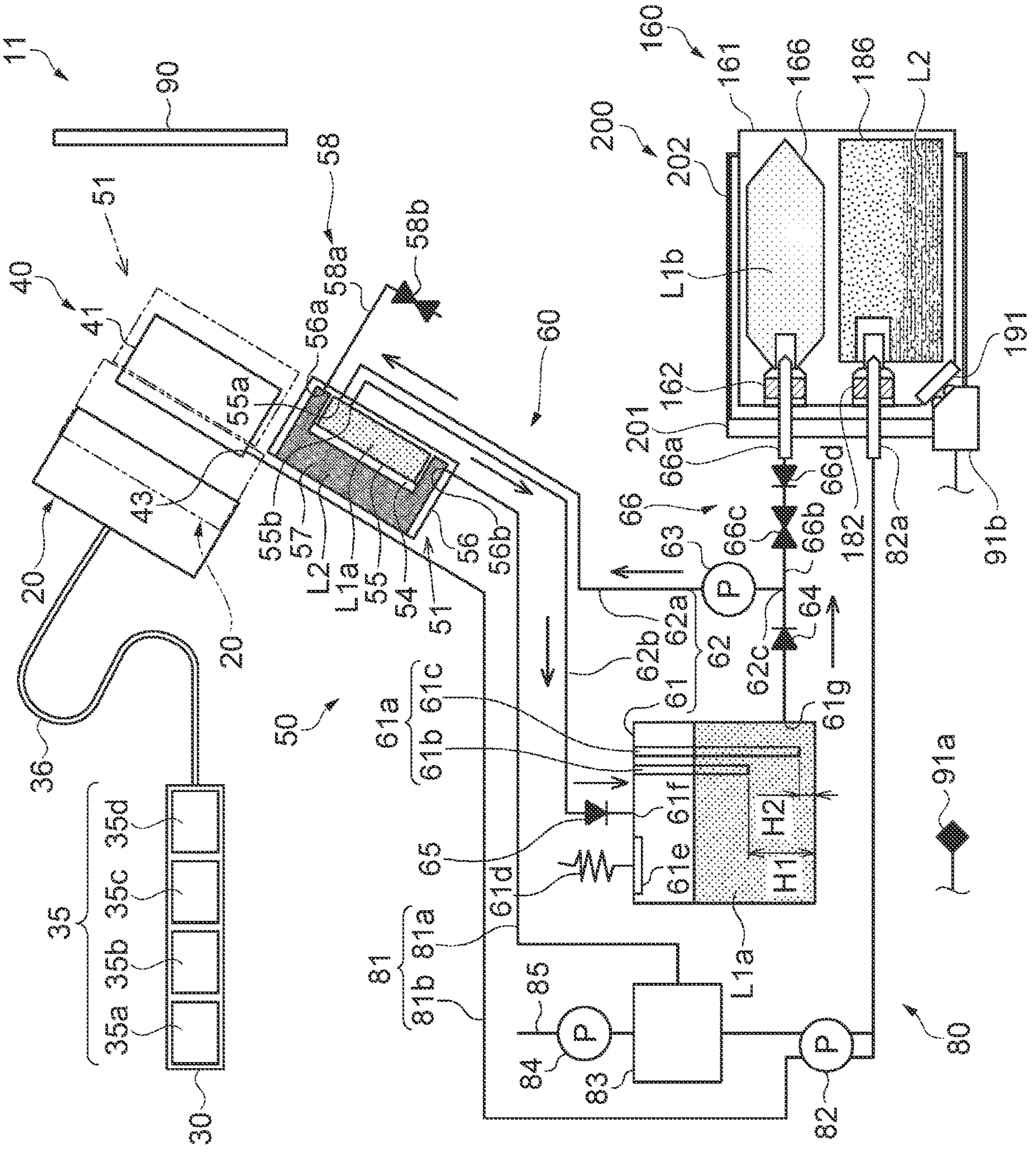
FIG. 6 is a schematic diagram illustrating a state of a moisturizing liquid when a circulation operation is executed.

Next, a circulation operation will be described. As illustrated in FIG. 6, the liquid discharge apparatus 11 performs the circulation operation in the cap apparatus 50. The circulation operation is an example of maintenance related to the moisturizing liquid L1*a*. In the circulation operation, when the first open/close valve 66*c* is in a closed valve state, the control portion 90 causes the moisturizing liquid circulation mechanism 60 to flow the moisturizing liquid L1*a* in the circulation path 62 in the direction of the arrow of the solid line illustrated in FIG. 6. Then, the control portion 90 confirms a moisture evaporation amount from the moisturizing liquid L1*a*.

A circulation path is constituted with the moisturizing liquid accommodating portion 61 accommodating the moisturizing liquid L1*a*, the supply flow path 62*a* communicating the moisturizing liquid accommodating portion 61 with the cap 51, the return flow path 62*b* communicating the cap 51 with the moisturizing liquid accommodating portion 61, and the humidifying chamber 55 in the cap 51. The moisturizing liquid L1*a* contains moisture for moisturizing the capping space CS formed by the recess portion 57 of the cap 51. It is desirable that the internal pressure in the cap 51 during the circulation operation be set to be equal to or lower than the meniscus withstand pressure of the liquid discharge head 21 by adjusting the circulation flow rate by the first pump 63.

As illustrated in FIG. 6, in the circulation operation, the moisturizing liquid L1*a* flows through the circulation path 62 in the direction of the arrow of the solid line illustrated in FIG. 6 to circulate in the circulation path. The control portion 90 causes the moisturizing liquid L1*a* to flow in the circulation path 62, so that the moisturizing liquid L1*a* flows in the humidifying chamber 55. Moisture from the moisturizing liquid L1*a* mainly evaporates in the humidifying chamber 55 in the cap 51. Then, for example, at the timing when the moisturizing liquid L1*a* in the humidifying chamber 55 flows into the moisturizing liquid accommodating portion 61 and the moisturizing liquid L1*a* in the moisturizing liquid accommodating portion 61 flows into the humidifying chamber 55, the control portion 90 stops the flow of the moisturizing liquid L1*a* and confirms the moisture evaporation amount from the moisturizing liquid L1*a*. That is, an object of the circulation operation in the maintenance related to the moisturizing liquid L1*a* includes confirming the moisture evaporation amount from the moisturizing liquid L1*a*.

The control portion 90 manages the time by a timer and the like, and periodically executes the circulation operation. For example, when the power of the liquid discharge apparatus 11 is turned on, the control portion 90 executes the circulation operation once a day. At the end of the flow of the circulation operation described later, the control portion 90 acquires information on the liquid surface height in the moisturizing liquid accommodating portion 61 from the liquid amount detecting portion 61*a*, to confirm the moisture evaporation amount from the moisturizing liquid L1*a*. When the moisture evaporation amount in the cap 51 is large, the liquid surface height in the moisturizing liquid accommodating portion 61 is lowered. The moisture evaporation amount increases during the time when the cap 51 is positioned at the retracted position illustrated in FIG. 6, that is, when the cap 51 does not form the capping space CS surrounding the opening of the nozzle 22 (see FIG. 2).

Therefore, the control portion 90 may perform the circulation operation by managing the time when the cap 51 is positioned at the retracted position for each temperature and humidity environment measured by the temperature sensor 91*a*. The control portion 90 may execute the circulation operation before the liquid discharge apparatus 11 is installed and first performs recording on the medium M, or before the cap 51 is replaced with the new cap 51 and recording is first performed on the medium M, or before the adjusting liquid accommodating portion 166 is replaced with the full accommodating body 160 and recording is first performed on the medium M.

Figure 7:
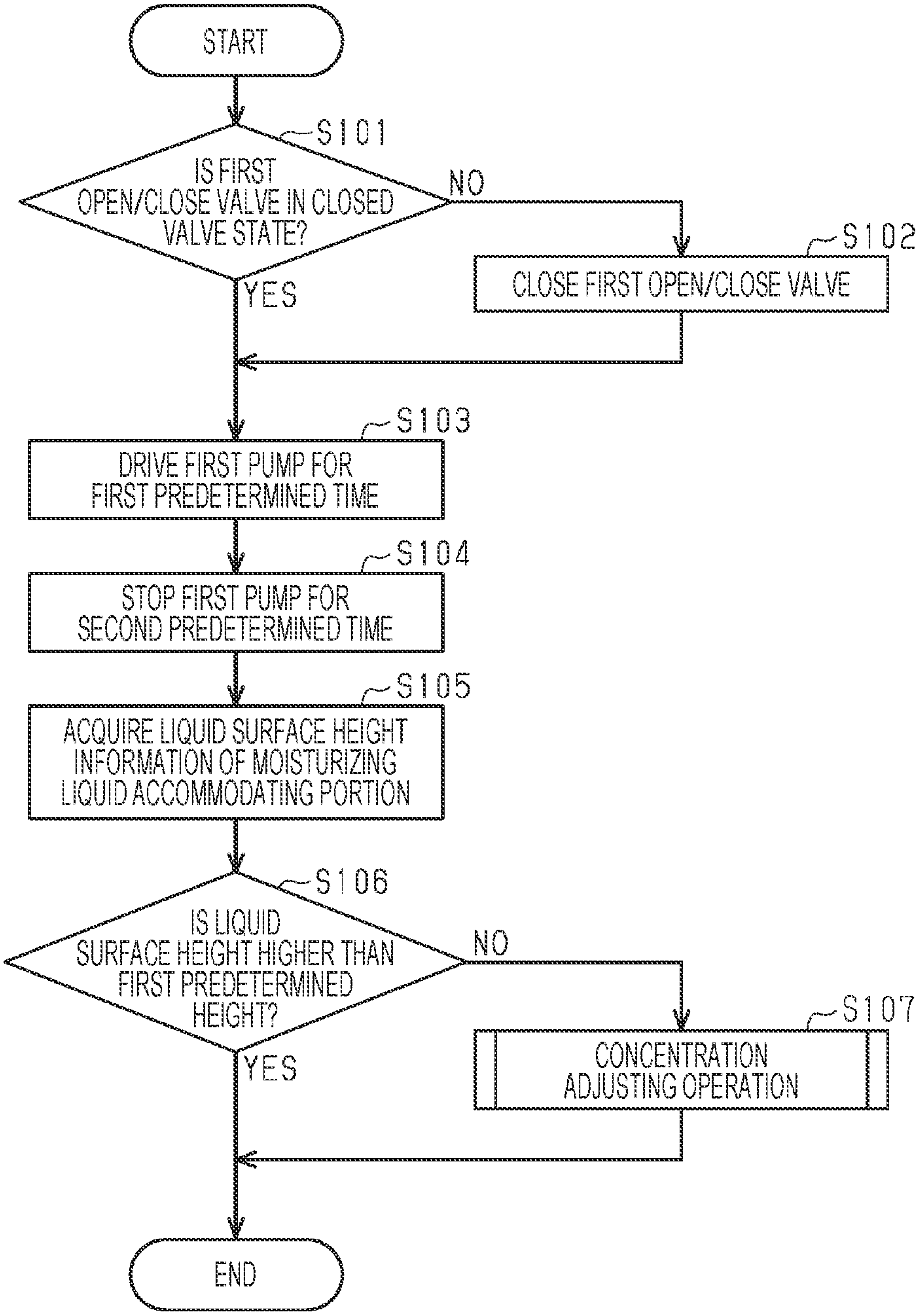
FIG. 7 is a flowchart illustrating the circulation operation.

Next, with reference to the flowchart illustrated in FIG. 7, the control executed by the control portion 90 in each step will be described in order with respect to the flow of the circulation operation. In the present embodiment, the flow of processing executed by the control portion 90 in the circulation operation corresponds to the control method of the liquid discharge apparatus 11.

In a step S101, the control portion 90 determines whether or not the first open/close valve 66*c* is in the closed valve state. When the first open/close valve 66*c* is in the closed valve state, the process proceeds to a step S103. When the first open/close valve 66*c* is in the open valve state, the process proceeds to a step S102. Then, in the step S102, the control portion 90 closes the first open/close valve 66*c* and proceeds to the step S103.

In the step S103, the control portion 90 drives the first pump 63 for a first predetermined time T1 when the first open/close valve 66*c* is in the closed valve state. As a result, the moisturizing liquid L1*a* flows in the circulation path 62 in the direction of the arrow of the solid line illustrated in FIG. 6. When the step S103 is executed, the control portion 90 proceeds to a step S104.

In the step S104, the control portion 90 stops the first pump 63 for a second predetermined time T2 when the first open/close valve 66*c* is in the closed valve state. As a result, the liquid surface state in the moisturizing liquid accommodating portion 61 is stabilized. When the step S104 is executed, the control portion 90 proceeds to a step S105.

In the step S105, the control portion 90 acquires information on the liquid surface height in the moisturizing liquid accommodating portion 61 from the liquid amount detecting portion 61*a*. Then, in a step S106, the control portion 90 determines whether or not the liquid surface height is higher than the first predetermined height H1. When the liquid surface height is higher than the first predetermined height H1, the flow is ended.

When the liquid surface height is lower than the first predetermined height H1, the process proceeds to a step S107. Then, in the step S107, the control portion 90 executes a subroutine of a concentration adjusting operation described later. When the subroutine of the concentration adjusting operation ends, the control portion 90 ends the flow.

Figure 8:
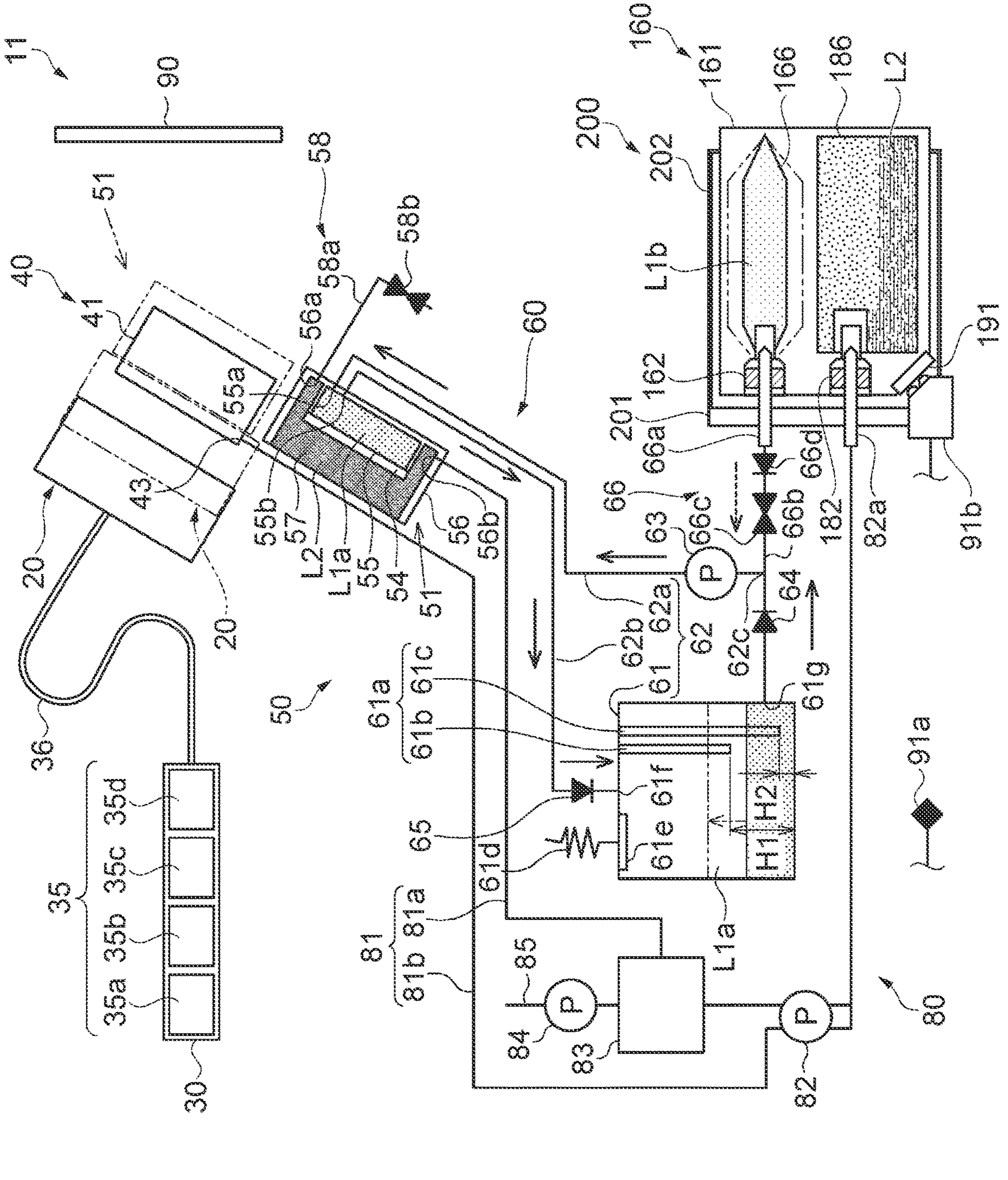
FIG. 8 is a schematic diagram illustrating a state of the moisturizing liquid when a concentration adjusting operation is executed.

Next, the concentration adjusting operation will be described. As illustrated in FIG. 8, the cap apparatus 50 performs the concentration adjusting operation. In the concentration adjusting operation, when the first open/close valve 66*c* is in the open valve state, the control portion 90 causes the moisturizing liquid circulation mechanism 60 to flow the moisturizing liquid L1*a* in the circulation path 62 in the direction of the arrow of the solid line illustrated in FIG. 8. At this time, since the first open/close valve 66*c* is in the open valve state, the concentration adjusting liquid L1*b* in the adjusting liquid accommodating portion 166 flows in the direction of the arrow of the broken line illustrated in FIG. 8 and is supplied into the circulation path 62. That is, the concentration adjusting operation includes supplying the concentration adjusting liquid L1*b* into the circulation path 62 by the adjusting liquid supply portion 66, and causing the moisturizing liquid L1*a* to flow in the circulation path 62. The concentration adjusting operation is an example of the maintenance related to the moisturizing liquid L1*a*.

The concentration adjusting operation, at the end of the flow of the circulation operation described above, is executed by the control portion 90 when the liquid amount detecting portion 61*a* detects that the liquid surface height inside the moisturizing liquid accommodating portion 61 when the control portion 90 acquires information on the liquid surface height inside the moisturizing liquid accommodating portion 61 is lower than the first predetermined height H1, which is an example of a "predetermined height".

That is, when the cap apparatus 50 performs the concentration adjusting operation when the liquid amount detecting portion 61*a* detects that the liquid surface in the moisturizing liquid accommodating portion 61 is below a predetermined height, the concentration adjusting liquid L1*b* in the adjusting liquid accommodating portion 166 is supplied into the circulation path 62 until it is detected that the liquid surface thereof is greater than or equal to a predetermined height. Then, after that, the cap apparatus 50 causes the moisturizing liquid L1*a* to flow in the circulation path 62. In other words, in the concentration adjusting operation, the liquid discharge apparatus 11 supplies the concentration adjusting liquid L1*b* accommodated in the accommodating body 160 to the moisturizing liquid accommodating portion 61 based on the detecting result of the liquid amount detecting portion 61*a*.

Moisture evaporates from the moisturizing liquid L1*a* in the cap 51, and the moisturizing liquid L1*a* circulates in the circulation path 62 by the circulation operation described above. As a result, the moisture in the moisturizing liquid accommodating portion 61 is also reduced, so that the liquid surface height in the moisturizing liquid accommodating portion 61 is lowered. As the evaporation further progresses, the liquid surface height in the moisturizing liquid accommodating portion 61 becomes lower than the first predetermined height H1. The first predetermined height H1 is set such that the concentration of the moisturizing liquid L1*a* at this time becomes larger than the predetermined concentration.

By executing the concentration adjusting operation by the control portion 90, the concentration adjusting liquid L1*b* in the adjusting liquid accommodating portion 166 is supplied into the circulation path 62 such that the liquid surface thereof becomes higher than the first predetermined height H1. In other words, the concentration adjusting liquid L1*b* in the adjusting liquid accommodating portion 166 is supplied into the circulation path 62, so that the liquid amount of the moisturizing liquid L1*a* accommodated in the moisturizing liquid accommodating portion 61 is adjusted. As a result, substantially the same amount of the concentration adjusting liquid L1*b* as the moisture evaporated in the cap 51 is supplied into the circulation path 62, and the concentration of the moisturizing liquid L1*a* becomes smaller than a predetermined concentration. That is, the concentration of the moisturizing liquid L1*a* returns to the concentration of the moisturizing liquid L1*a* before the moisture evaporates in the cap 51.

In the concentration adjusting operation, the control portion 90 causes the first open/close valve 66*c* to be in the open valve state, and supplies the concentration adjusting liquid L1*b* in the adjusting liquid accommodating portion 166 into the circulation path 62. Then, when it is determined that the liquid surface height in the moisturizing liquid accommodating portion 61 is higher than the first predetermined height H1, the control portion 90 causes the first open/close valve 66*c* to be in the closed valve state, performs the circulation operation described above, and causes the moisturizing liquid L1*a* in the moisturizing liquid accommodating portion 61 to flow in the circulation path 62. That is, the concentration adjusting operation includes opening the first open/close valve 66*c*, which is an example of the open/close valve, when the concentration adjusting liquid L1*b* in the adjusting liquid accommodating portion 166 is supplied into the circulation path 62, and closing the first open/close valve 66*c* when the moisturizing liquid L1*a* is caused to flow in the circulation path 62.

In the first merging portion 62*c* of the circulation path 62, the moisturizing liquid L1*a* flowing from the moisturizing liquid accommodating portion 61 and the concentration adjusting liquid L1*b* flowing from the adjusting liquid accommodating portion 166 merge. When the volume of the concentration adjusting liquid L1*b* flowing from the adjusting liquid accommodating portion 166 is larger than the volume of the moisturizing liquid L1*a* flowing from the moisturizing liquid accommodating portion 61, the rate of change of the liquid surface height in the moisturizing liquid accommodating portion 61 becomes faster, and the liquid surface detection variation becomes larger, so that it is difficult to detect the liquid surface height in a timely manner. Therefore, in the first merging portion 62*c*, it is desirable that the pressure loss of the flow path on the side of the adjusting liquid accommodating portion 166 may be set to be the same as or larger than the pressure loss of the flow path on the side of the moisturizing liquid accommodating portion 61.

Figure 9:
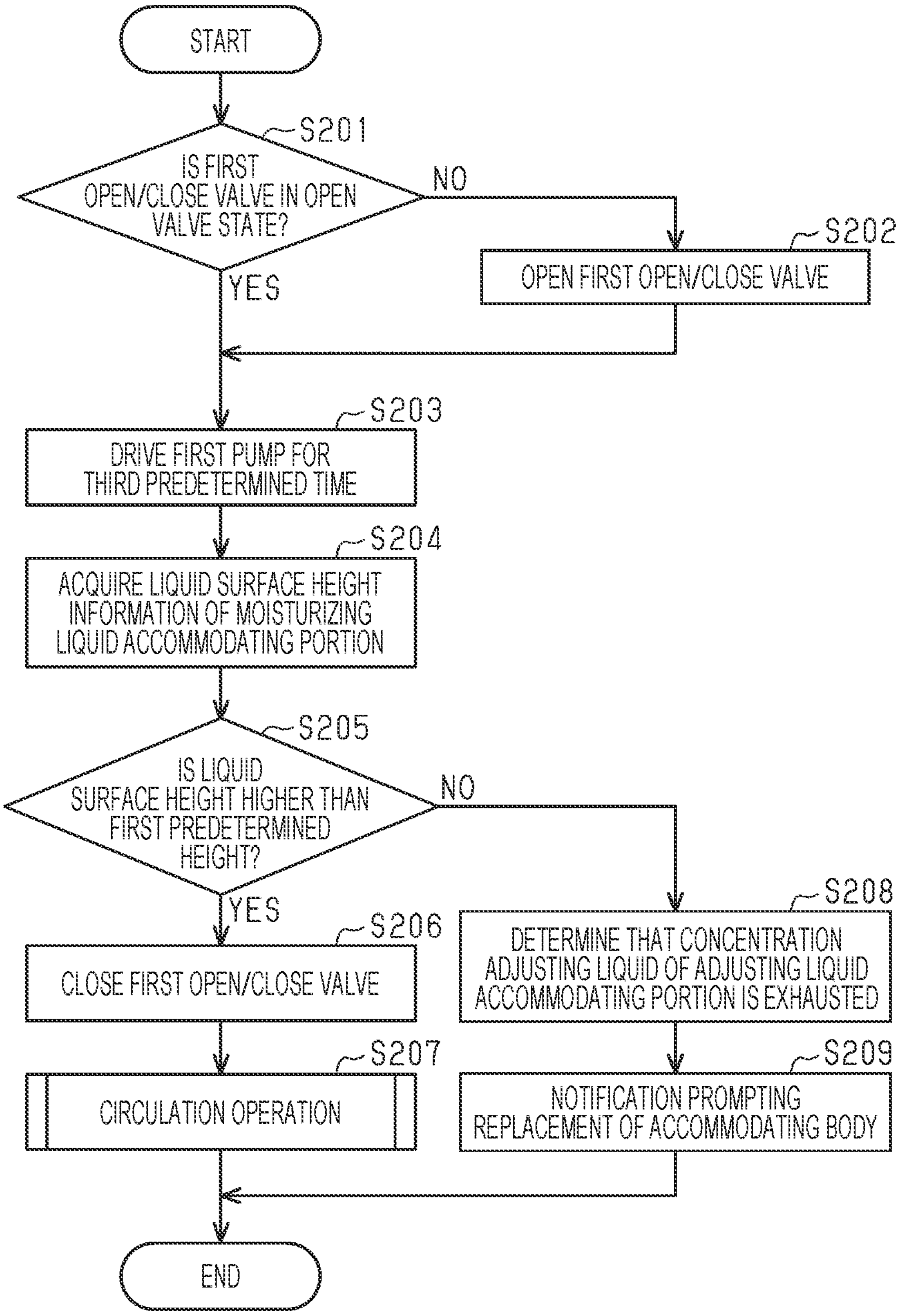
FIG. 9 is a flowchart illustrating the concentration adjusting operation.

Next, with reference to the flowchart illustrated in FIG. 9, the control executed by the control portion 90 in each step will be described in order with respect to the flow of the concentration adjusting operation. In the present embodiment, the flow of processing executed by the control portion 90 in the concentration adjusting operation corresponds to the control method of the liquid discharge apparatus 11.

In a step S201, the control portion 90 determines whether or not the first open/close valve 66*c* is in the open valve state. When the first open/close valve 66*c* is in the open valve state, the process proceeds to a step S203. When the first open/close valve 66*c* is in the closed valve state, the process proceeds to a step S202. In the step S202, the control portion 90 opens the first open/close valve 66*c* and proceeds to the step S203.

In the step S203, the control portion 90 drives the first pump 63 for a third predetermined time T3 when the first open/close valve 66*c* is in the open valve state. As a result, the moisturizing liquid L1*a* flows in the circulation path 62 in the direction of the arrow of the solid line illustrated in FIG. 8. Then, the concentration adjusting liquid L1*b* flows in the adjusting liquid supply flow path 66*b* in the direction of the arrow of the broken line illustrated in FIG. 8, and merges with the moisturizing liquid L1*a* at the first merging portion 62*c*. Then, the moisturizing liquid L1*a* and the concentration adjusting liquid L1*b* that has been merged become the moisturizing liquid L1*a* in which the amount of moisture is increased, flow inside of the circulation path 62 from the first merging portion 62*c* toward the cap 51 in the direction of the arrow of the solid line illustrated in FIG. 8, and flow into the moisturizing liquid accommodating portion 61. Then, the liquid surface in the moisturizing liquid accommodating portion 61 becomes higher than the first predetermined height H1.

In a step S204, the control portion 90 acquires information on the liquid surface height in the moisturizing liquid accommodating portion 61 from the liquid amount detecting portion 61*a*. Then, in a step S205, the control portion 90 determines whether or not the liquid surface height is higher than the first predetermined height H1. When the liquid surface height is higher than the first predetermined height H1, the process proceeds to a step S206. When the liquid surface height is lower than the first predetermined height H1, the process proceeds to a step S208.

In the step S206, the control portion 90 closes the first open/close valve 66*c*, and in a step S207, the control portion 90 executes the subroutine of the circulation operation described above. When the control portion 90 ends the subroutine of the circulation operation, the control portion 90 ends the flow.

In the step S208, the control portion 90 determines that the concentration adjusting liquid L1*b* in the adjusting liquid accommodating portion 166 is exhausted, and in a step S209, the control portion 90 performs a notification prompting the replacement of the accommodating body 160. Specifically, the control portion 90 performs the notification prompting the replacement of the accommodating body 160 to the user by displaying a message on the liquid crystal screen of the operation portion 15 to the effect that the accommodating body 160 needs to be replaced. When the step S209 is executed, the control portion 90 ends the flow.

In the steps S203 to S205, the control portion 90 may acquire information on the liquid surface height in the moisturizing liquid accommodating portion 61 from the liquid amount detecting portion 61*a* when the first open/close valve 66*c* is in the open valve state and drive the first pump 63, and may stop the first pump 63 when the liquid surface height becomes higher than the first predetermined height H1. Then, when the third predetermined time T3 elapses after the first pump 63 is driven, in a case where the liquid amount detecting portion 61*a* detects that the liquid surface height is lower than the first predetermined height H1, in the step S208, the control portion 90 may determine that the concentration adjusting liquid L1*b* in the adjusting liquid accommodating portion 166 is exhausted.

Next, the replacement monitoring processing of the accommodating body 160 will be described. The accommodating body 160 provided with the adjusting liquid accommodating portion 166 accommodating the concentration adjusting liquid L1*b* is detachable from the accommodating body mounting portion 200 by a user. Therefore, in executing the maintenance related to the moisturizing liquid L1*a*, the control portion 90 monitors the attachment and detachment of the accommodating body 160 with respect to the accommodating body mounting portion 200 and whether or not the accommodating body 160 is replaced when the liquid discharge apparatus 11 is activated.

The control portion 90 acquires the information stored in the circuit substrate 191 included in the accommodating body 160 via the replacement detecting portion 91*b* provided in the accommodating body mounting portion 200. Then, the control portion 90 determines whether or not the accommodating body 160 mounted on the accommodating body mounting portion 200 is replaced based on the information related to the accommodating body 160 stored in the circuit substrate 191. In other words, the control portion 90 detects the replacement of the accommodating body 160 via the replacement detecting portion 91*b* based on the information related to the accommodating body 160 acquired from the accommodating body 160.

Further, the control portion 90 updates the information stored in the circuit substrate 191 included in the accommodating body 160 via the replacement detecting portion 91*b* provided in the accommodating body mounting portion 200. For example, the control portion 90 updates the remaining amount of the concentration adjusting liquid L1*b* accommodated in the accommodating body 160, the holding amount of the waste liquid L2 accommodated in the waste liquid accommodating portion 186, and the information such as the history that the accommodating body 160 has been previously mounted on the accommodating body mounting portion 200, and the year, month, date, and time at that time.

Figure 10:
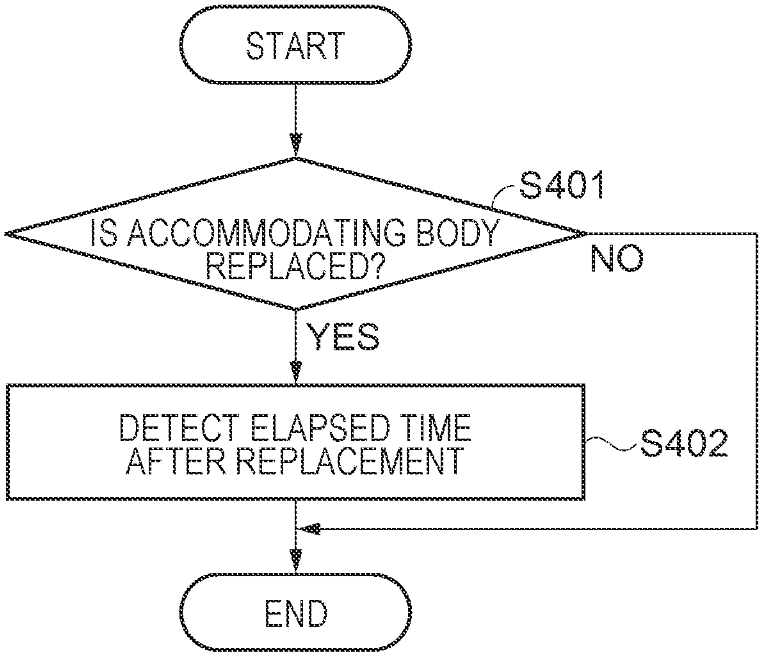
FIG. 10 is a flowchart illustrating replacement monitoring processing of an accommodating body.

Next, with reference to the flowchart illustrated in FIG. 10, the control executed by the control portion 90 in each step will be described in order in regard to the flow of the replacement monitoring processing of the accommodating body 160.

In a step S401, the control portion 90 determines whether or not the accommodating body 160 is replaced. When the accommodating body 160 is replaced, the process proceeds to a step S402. When the accommodating body 160 is not replaced, the flow is ended.

In the step S402, the control portion 90 starts the measurement of elapsed time by a timer and the like after the accommodating body 160 is replaced. The measurement of the elapsed time from the replacement of the accommodating body 160 is performed during a period until the next replacement of the accommodating body 160 is detected, or a period until a predetermined time Tm, which will be described later, elapses. When the step S402 is executed, the control portion 90 ends the flow.

Next, maintenance and maintenance preprocessing related to the moisturizing liquid L1*a* will be described. Since the moisturizing liquid L1*a* and the concentration adjusting liquid L1*b* are liquids, there is a risk of freezing when the ambient temperature is equal to or lower than the freezing point. Further, when the accommodating body 160 stored in an environment equal to or lower than the freezing point of the concentration adjusting liquid L1*b* is mounted on the accommodating body mounting portion 200, although the ambient temperature inside the main body 12 is higher than the freezing point of the concentration adjusting liquid L1*b*, there is a risk that the concentration adjusting liquid L1*b* in the accommodating body 160 is frozen when the predetermined time Tm has not elapsed after the accommodating body 160 is mounted on the accommodating body mounting portion 200.

Therefore, in the liquid discharge apparatus 11 of the present embodiment, when the control portion 90 performs the maintenance related to the moisturizing liquid L1*a*, the control portion 90 performs the maintenance preprocessing before performing the maintenance related to the moisturizing liquid L1*a*. In the maintenance preprocessing, the control portion 90 confirms whether or not the ambient temperature in the main body 12 measured by the temperature sensor 91*a* is equal to or higher than a preset threshold value Th. When the ambient temperature in the main body 12 is lower than the preset threshold value Th, the control portion 90 does not execute the maintenance related to the moisturizing liquid L1*a* because there is a risk that the maintenance related to the moisturizing liquid L1*a* cannot be normally executed. In other words, when the ambient temperature of the liquid discharge apparatus 11 is lower than the preset threshold value Th, the control portion 90 restricts the maintenance related to the moisturizing liquid L1*a*. In the present embodiment, since the main components of the moisturizing liquid L1*a* and the concentration adjusting liquid L1*b* are pure water, the threshold value Th is set to 5° C., which is higher than the freezing point of water, 0° C.

Further, in the maintenance preprocessing, the control portion 90 confirms whether or not the predetermined time Tm or more has elapsed after the replacement of the accommodating body 160 is detected by the replacement detecting portion 91*b*. When the elapsed time after the replacement of the accommodating body 160 is detected is shorter than the predetermined time Tm, there is a risk that the concentration adjusting liquid L1*b* in the accommodating body 160 is frozen although the ambient temperature in the main body 12 is higher than the freezing point of the concentration adjusting liquid L1*b*. Therefore, when the elapsed time after the replacement of the accommodating body 160 is detected is shorter than the predetermined time Tm, the control portion 90 does not execute the maintenance related to the moisturizing liquid L1*a*. In other words, when the replacement detecting portion 91*b* detects the replacement of the accommodating body 160, the control portion 90 restricts the maintenance related to the moisturizing liquid L1*a* until the predetermined time Tm elapses after the replacement of the accommodating body 160 is detected.

The predetermined time Tm is set based on the time required for the frozen concentration adjusting liquid L1*b* to thaw in an environment in which the ambient temperature in the main body 12 is the threshold value Th. For example, in an environment in which the ambient temperature inside the main body 12 is 5° C., it is assumed that the time required for the frozen concentration adjusting liquid L1*b* to thaw is 12 hours. In this case, the predetermined time Tm is set to 12 hours.

Figure 11:
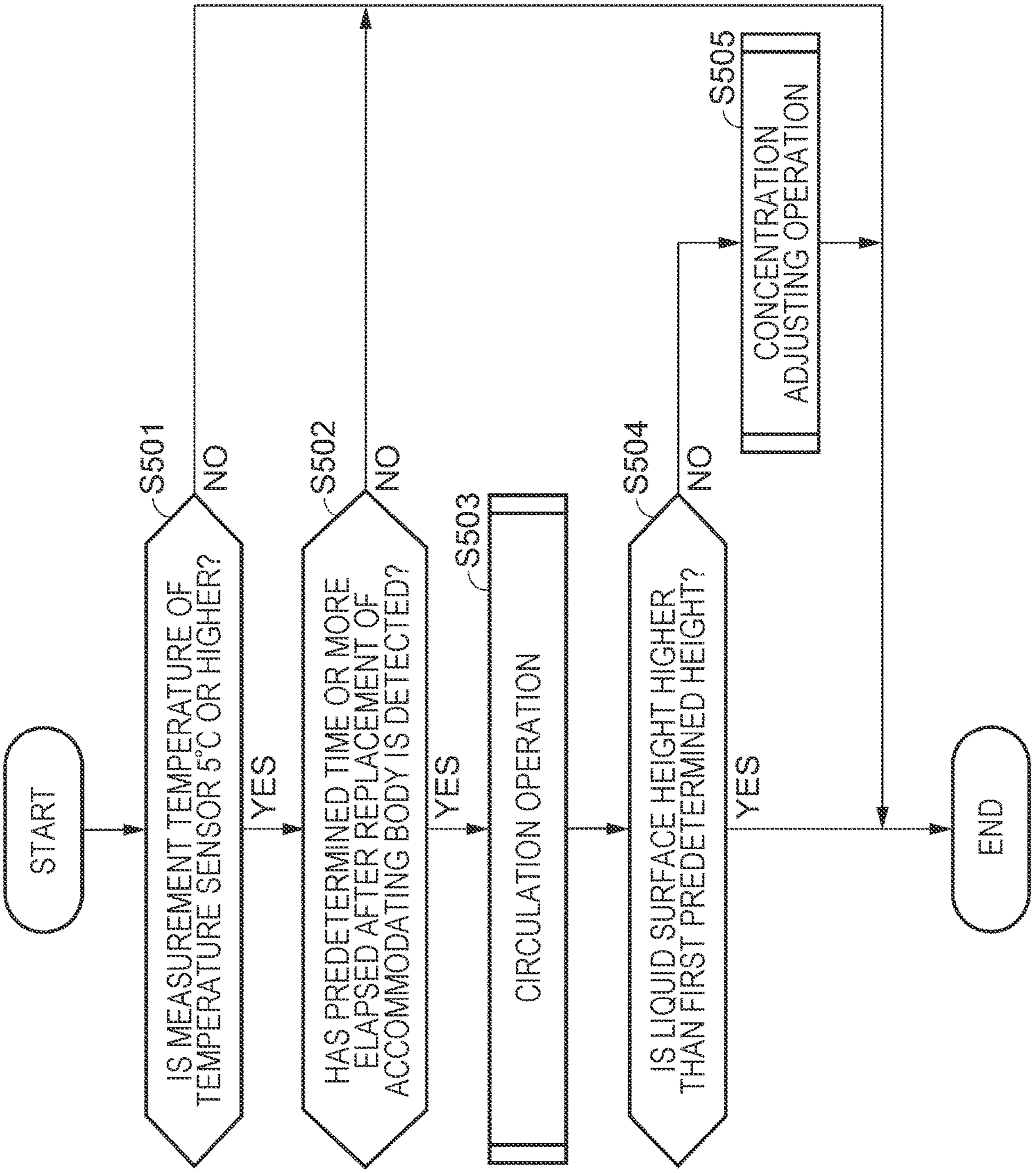
FIG. 11 is a flowchart illustrating maintenance and maintenance preprocessing related to the moisturizing liquid.

Next, with reference to the flowchart illustrated in FIG. 11, the process executed by the control portion 90 in each step will be described in order in regard to the flow of the maintenance and the maintenance preprocessing related to the moisturizing liquid L1*a*. In the present embodiment, the flow of processing executed by the control portion 90 in the maintenance and the maintenance preprocessing related to the moisturizing liquid L1*a* corresponds to the control method of the liquid discharge apparatus 11.

In a step S501, the control portion 90 confirms whether or not the temperature measured by the temperature sensor 91*a* is 5° C. or higher. That is, the control portion 90 confirms whether or not the ambient temperature of the liquid discharge apparatus 11 is equal to or higher than the preset threshold value Th. When the temperature measured by the temperature sensor 91*a* is 5° C. or higher, the process proceeds to a step S502. When the temperature measured by the temperature sensor 91*a* is less than 5° C., the flow is ended.

In the step S502, after the replacement of the accommodating body 160 is detected, the control portion 90 confirms whether or not the predetermined time Tm or more has elapsed. When the predetermined time Tm or more has elapsed after the replacement detection of the accommodating body 160 by the replacement detecting portion 91*b*, the process proceeds to a step S503. When the predetermined time Tm has not elapsed after the replacement detection of the accommodating body 160 by the replacement detecting portion 91*b*, the flow is ended.

In the step S503, the control portion 90 executes the subroutine of the circulation operation described above. When the control portion 90 ends the subroutine of the circulation operation, the process proceeds to a step S504.

In the step S504, the control portion 90 determines whether or not the liquid surface height is higher than the first predetermined height H1. When the liquid surface height is higher than the first predetermined height H1, the flow is ended.

In the step S504, when the liquid surface height is lower than the first predetermined height H1, the process proceeds to a step S505. Then, in the step S505, the control portion 90 executes the subroutine of the concentration adjusting operation. When the subroutine of the concentration adjusting operation ends, the control portion 90 ends the flow.

As described above, according to the liquid discharge apparatus 11 and the control method of the liquid discharge apparatus 11 according to the first embodiment, the following effects can be obtained.

The liquid discharge apparatus 11 includes the liquid discharge portion 20 that discharges ink from the nozzle 22, the cap 51 that is configured to form the capping space CS in which the nozzle 22 opens in contact with the liquid discharge portion 20, the moisturizing liquid accommodating portion 61 that accommodates the moisturizing liquid L1*a* that moisturizes the cap 51, the accommodating body mounting portion 200 that is configured to mount the accommodating body 160 that accommodates the concentration adjusting liquid L1*b* for adjusting a liquid amount of the moisturizing liquid L1*a* accommodated in the moisturizing liquid accommodating portion 61, the replacement detecting portion 91*b* that is configured to detect replacement of the accommodating body 160 mounted on the accommodating body mounting portion 200, and the control portion 90 that controls the maintenance related to the moisturizing liquid L1*a*, in which when the replacement detecting portion 91*b* detects the replacement of the accommodating body 160, the control portion 90 restricts the maintenance related to the moisturizing liquid L1*a* until the predetermined time Tm elapses after the replacement of the accommodating body 160 is detected. According to this, it is possible to suppress the execution of the maintenance related to the moisturizing liquid L1*a* in a state in which the concentration adjusting liquid L1*b* accommodated in the accommodating body 160 mounted on the accommodating body mounting portion 200 is frozen, or in a state in which the viscosity of the concentration adjusting liquid L1*b* accommodated in the accommodating body 160 mounted on the accommodating body mounting portion 200 is high. Therefore, the maintenance related to the moisturizing liquid L1*a* can be normally performed, and the cap 51 can be moisturized.

When the ambient temperature of the liquid discharge apparatus 11 is lower than the preset threshold value Th, the control portion 90 restricts the maintenance related to the moisturizing liquid L1*a*. According to this, it is possible to suppress the execution of the maintenance related to the moisturizing liquid L1*a* in a state in which either the moisturizing liquid L1*a* or the concentration adjusting liquid L1*b* is frozen, or in a state in which any one of the moisturizing liquid L1*a* and the concentration adjusting liquid L1*b* has a high viscosity. Therefore, the maintenance related to the moisturizing liquid L1*a* can be normally performed, and the cap 51 can be moisturized.

The liquid discharge apparatus 11 includes the circulation path 62 through which the moisturizing liquid accommodating portion 61 communicates with the cap 51 and the first pump 63 that causes the moisturizing liquid L1*a* to flow in the circulation path 62, in which the maintenance related to the moisturizing liquid L1*a* is the circulation operation of the moisturizing liquid L1*a* in the circulation path 62. According to this, the cap 51 can be moisturized by performing the circulation operation of the moisturizing liquid L1*a* in the circulation path 62.

The liquid discharge apparatus 11 includes the liquid amount detecting portion 61*a* that detects an amount of the moisturizing liquid L1*a* accommodated in the moisturizing liquid accommodating portion 61, in which the concentration adjusting liquid L1*b* accommodated in the accommodating body 160 is supplied to the moisturizing liquid accommodating portion 61 based on a detecting result of the liquid amount detecting portion 61*a*. According to this, since the concentration adjusting liquid L1*b* can be supplied to the moisturizing liquid accommodating portion 61 based on the amount of the moisturizing liquid L1*a* accommodated in the moisturizing liquid accommodating portion 61, the concentration of the moisturizing liquid L1*a* can be easily adjusted.

The control portion 90 detects the replacement of the accommodating body 160 via the replacement detecting portion 91*b* based on the information related to the accommodating body 160 acquired from the accommodating body 160. According to this, it is possible to determine whether or not the replacement of the accommodating body 160 is performed based on the information related to the accommodating body 160.

The main component of the concentration adjusting liquid L1*b* is water, and the threshold value Th is higher than 0° C. According to this, it is possible to suppress the execution of the maintenance related to the moisturizing liquid L1*a* in a state in which the concentration adjusting liquid L1*b* is frozen.

The liquid discharge apparatus 11 includes the liquid discharge portion 20 that discharges ink from the nozzle 22, the cap 51 that is configured to form the capping space CS in which the nozzle 22 opens in contact with the liquid discharge portion 20, the moisturizing liquid accommodating portion 61 that accommodates the moisturizing liquid L1*a* that moisturizes the cap 51, the adjusting liquid accommodating portion 166 that accommodates the concentration adjusting liquid L1*b* for adjusting a concentration of the moisturizing liquid L1*a*, the control portion 90 that controls the maintenance related to the moisturizing liquid L1*a*, and the main body 12 in which the liquid discharge portion 20, the cap 51, the moisturizing liquid accommodating portion 61, the adjusting liquid accommodating portion 166, and the control portion 90 are disposed, in which the control portion 90 restricts the maintenance related to the moisturizing liquid L1*a* when an ambient temperature of the main body 12 is lower than the preset threshold value Th. According to this, it is possible to suppress the execution of the maintenance related to the moisturizing liquid L1*a* in a state in which either the moisturizing liquid L1*a* or the concentration adjusting liquid L1*b* is frozen, or in a state in which any one of the moisturizing liquid L1*a* and the concentration adjusting liquid L1*b* has a high viscosity. Therefore, the maintenance related to the moisturizing liquid L1*a* can be normally performed, and the cap 51 can be moisturized.

A control method of the liquid discharge apparatus 11 including the liquid discharge portion 20 that discharges ink from the nozzle 22, the cap 51 that is configured to form the capping space CS in which the nozzle 22 opens in contact with the liquid discharge portion 20, the moisturizing liquid accommodating portion 61 that accommodates the moisturizing liquid L1*a* that moisturizes the cap 51, and the accommodating body mounting portion 200 that is configured to mount the accommodating body 160 that accommodates the concentration adjusting liquid L1*b* for adjusting a concentration of the moisturizing liquid L1*a*, the control method includes detecting replacement of the accommodating body 160 mounted in the accommodating body mounting portion 200, and performing the maintenance related to the moisturizing liquid L1*a*, in which when the replacement of the accommodating body 160 is detected, the maintenance related to the moisturizing liquid L1*a* is restricted until the predetermined time Tm elapses after the replacement of the accommodating body 160 is detected. According to this, it is possible to suppress the execution of the maintenance related to the moisturizing liquid L1*a* in a state in which the concentration adjusting liquid L1*b* accommodated in the accommodating body 160 mounted on the accommodating body mounting portion 200 is frozen, or in a state in which the viscosity of the concentration adjusting liquid L1*b* accommodated in the accommodating body 160 mounted on the accommodating body mounting portion 200 is high. Therefore, the maintenance related to the moisturizing liquid L1*a* can be normally performed, and the cap 51 can be moisturized.

The control method of the liquid discharge apparatus 11 includes measuring an ambient temperature of the liquid discharge apparatus 11, in which the maintenance related to the moisturizing liquid L1*a* is restricted when the ambient temperature of the liquid discharge apparatus 11 is lower than the preset threshold value Th. According to this, it is possible to suppress the execution of the maintenance related to the moisturizing liquid L1*a* in a state in which either the moisturizing liquid L1*a* or the concentration adjusting liquid L1*b* is frozen, or in a state in which any one of the moisturizing liquid L1*a* and the concentration adjusting liquid L1*b* has a high viscosity. Therefore, the maintenance related to the moisturizing liquid L1*a* can be normally performed, and the cap 51 can be moisturized.

The liquid discharge apparatus 11 and the control method of the liquid discharge apparatus 11 according to the embodiment described above of the present disclosure are based on having the configuration described above, but of course, it is also possible to change or omit the partial configuration within a range not departing from the gist of the present disclosure. Further, the embodiment described above and other embodiments described below can be implemented in combination with each other within a technically consistent range. Hereinafter, other embodiments will be described.

In the embodiment described above, when the temperature sensor 91*a* can measure the temperature of the atmosphere inside the main body 12, the temperature sensor 91*a* may not be able to measure the humidity of the atmosphere inside the main body 12. Further, for example, the temperature sensor 91*a* may be disposed in the medium accommodating portion 16 of the main body 12 as long as the temperature of the atmosphere in the main body 12 can be measured. Alternatively, for example, the temperature sensor 91*a* may be disposed in the stacking portion 17 of the main body 12 as long as a temperature equal to the temperature of the atmosphere in the main body 12 can be measured.

In the embodiment described above, the liquid discharge apparatus 11 may not include the temperature sensor 91*a* in the main body 12. For example, an external apparatus that is configured to measure the ambient temperature is disposed in a room in which the liquid discharge apparatus 11 is installed. Then, the liquid discharge apparatus 11 is connected to the external apparatus by a communication cable, a wireless communication line, and the like (not illustrated). Then, the liquid discharge apparatus 11 may measure the ambient temperature of the liquid discharge apparatus 11 via the external apparatus.

In the embodiment described above, the control portion 90 may not detect the replacement of the accommodating body 160 based on the information related to the accommodating body 160 acquired from the accommodating body 160. For example, the control portion 90 may detect the replacement of the accommodating body 160 based on a change between a state in which electrical coupling is not made or a state in which electrical coupling is made, between the replacement detecting portion 91*b* and the circuit substrate 191 included in the accommodating body 160. In this case, the circuit substrate 191 may not include a storage portion.

In the embodiment described above, even during the period in which the maintenance related to the moisturizing liquid L1*a* is restricted, when it can be determined that the concentration adjusting liquid L1*b* in the accommodating body 160 is not frozen, the control portion 90 may execute the maintenance related to the moisturizing liquid L1*a*. For example, in an environment in which the ambient temperature is 30° C., it is assumed that the time required for the frozen concentration adjusting liquid L1*b* to thaw is 6 hours. Then, for example, in a case where the ambient temperature in the main body 12 measured by the temperature sensor 91*a* is 30° C., which is higher than the threshold value Th of 5° C., when 6 hours have elapsed after the replacement of the accommodating body 160 is detected, it can be determined that the concentration adjusting liquid L1*b* in the accommodating body 160 mounted on the accommodating body mounting portion 200 is not frozen.

In such a case, the control portion 90 may execute either the circulation operation or the concentration adjusting operation although 12 hours, which is the predetermined time Tm, has not elapsed after the replacement of the accommodating body 160 is detected. In other words, in the period in which the maintenance related to the moisturizing liquid L1*a* is restricted, when the ambient temperature of the liquid discharge apparatus 11 is higher than the threshold value Th, the control portion 90 releases the restriction on the maintenance related to the moisturizing liquid L1*a*. According to this, it is possible to avoid restricting the maintenance related to the moisturizing liquid L1*a* although the concentration adjusting liquid L1*b* in the accommodating body 160 is not frozen.

In the embodiment described above, when it can be determined that the concentration adjusting liquid L1*b* in the accommodating body 160 mounted on the accommodating body mounting portion 200 is not frozen, it may not perform restriction on the maintenance related to the moisturizing liquid L1*a* based on the elapsed time after the replacement of the accommodating body 160 is detected. In this case, for example, in the step S502 of the flowchart illustrated in FIG. 11, the control portion 90 confirms whether or not the concentration adjusting liquid L1*b* in the accommodating body 160 is not frozen and whether or not the predetermined time Tm or more has elapsed after the replacement detection of the accommodating body 160. When the concentration adjusting liquid L1*b* in the accommodating body 160 is not frozen, or when the predetermined time Tm or more has elapsed after the replacement detection of the accommodating body 160, the process proceeds to the step S503. When the concentration adjusting liquid L1*b* in the accommodating body 160 is frozen, or when the predetermined time Tm or more has not elapsed after the replacement detection of the accommodating body 160, the flow is ended.

As a method of determining whether or not the concentration adjusting liquid L1*b* in the accommodating body 160 mounted on the accommodating body mounting portion 200 is frozen, for example, in the replacement monitoring processing of the accommodating body 160, when the replacement of the accommodating body 160 is detected, the first open/close valve 66*c* is set to be in the open valve state, and the first pump 63 is driven for the third predetermined time T3. Then, confirmation is made on whether or not the liquid surface height in the moisturizing liquid accommodating portion 61 is higher than the first predetermined height H1. When the liquid surface height in the moisturizing liquid accommodating portion 61 is higher than the first predetermined height H1, since the concentration adjusting liquid L1*b* in the adjusting liquid accommodating portion 166 is supplied into the circulation path 62, it can be determined that the concentration adjusting liquid L1*b* is not frozen. When the liquid surface height in the moisturizing liquid accommodating portion 61 is lower than the first predetermined height H1, since the concentration adjusting liquid L1*b* in the adjusting liquid accommodating portion 166 is not supplied into the circulation path 62, it can be determined that the probability of freezing is high.

In the embodiment described above, the adjusting liquid accommodating portion 166 may not be disposed in the accommodating body 160. Then, the adjusting liquid accommodating portion 166 may not be configured to be replaceable by the user. For example, the adjusting liquid accommodating portion 166 is fixed to the main body 12 in a state of communicating with the outlet pipe 66*a* of the adjusting liquid supply portion 66. In this case, since the adjusting liquid accommodating portion 166 is not replaced, in the replacement processing of the accommodating body 160, the control portion 90 may not start measuring the elapsed time after the accommodating body 160 is replaced. Further, in this case, the control portion 90 may not perform restriction on the maintenance related to the moisturizing liquid L1*a* based on the elapsed time after the replacement of the accommodating body 160 is detected.

What is claimed is:

1. A liquid discharge apparatus comprising:

a liquid discharge portion that discharges a liquid from a nozzle;

a cap configured to form a closed space to which the nozzle opens by contacting the liquid discharge portion;

a moisturizing liquid accommodating portion configured to accommodate a moisturizing liquid that moisturizes the cap;

an accommodating body mounting portion to which an accommodating body that accommodates an adjusting liquid is detachably mounted, the adjusting liquid being for adjusting a liquid amount of the moisturizing liquid accommodated in the moisturizing liquid accommodating portion;

a replacement detecting portion configured to detect replacement of the accommodating body mounted on the accommodating body mounting portion; and a control portion that controls maintenance related to the moisturizing liquid, wherein when the replacement detecting portion detects the replacement of the accommodating body, the control portion restricts the maintenance related to the moisturizing liquid until a predetermined time elapses after the replacement of the accommodating body is detected.

2. The liquid discharge apparatus according to claim 1, wherein when an ambient temperature of the liquid discharge apparatus is lower than a preset threshold value, the control portion restricts the maintenance related to the moisturizing liquid.

3. The liquid discharge apparatus according to claim 2, wherein when the ambient temperature becomes higher than the threshold value in a period in which the maintenance related to the moisturizing liquid is restricted, the control portion releases the restriction on the maintenance related to the moisturizing liquid regardless of whether or not the predetermined period elapses.

4. The liquid discharge apparatus according to claim 2, wherein a main component of the adjusting liquid is water, and the threshold value is higher than 0° C.

5. The liquid discharge apparatus according to claim 1, further comprising:

a circulation path that communicates between the moisturizing liquid accommodating portion and the cap; and a pump that causes the moisturizing liquid to flow in the circulation path, wherein the maintenance related to the moisturizing liquid is a circulation operation of the moisturizing liquid in the circulation path.

6. The liquid discharge apparatus according to claim 1, further comprising:

a liquid amount detecting portion that detects an amount of the moisturizing liquid accommodated in the moisturizing liquid accommodating portion, wherein the adjusting liquid accommodated in the accommodating body is supplied to the moisturizing liquid accommodating portion based on a detecting result of the liquid amount detecting portion.

7. The liquid discharge apparatus according to claim 1, wherein the control portion detects replacement of the accommodating body, via the replacement detecting portion, based on information on the accommodating body acquired from the accommodating body.

8. A liquid discharge apparatus comprising:

a liquid discharge portion that discharges a liquid from a nozzle;

a cap configured to form a closed space to which the nozzle opens by contacting the liquid discharge portion;

a moisturizing liquid accommodating portion configured to accommodate a moisturizing liquid that moisturizes the cap;

an adjusting liquid accommodating portion that accommodates an adjusting liquid for adjusting a concentration of the moisturizing liquid;

a control portion that controls maintenance related to the moisturizing liquid; and a main body in which the liquid discharge portion, the cap, the moisturizing liquid accommodating portion, the adjusting liquid accommodating portion, and the control portion are disposed, wherein the control portion restricts the maintenance related to the moisturizing liquid when an ambient temperature of the main body is lower than a preset threshold value.

9. A control method of a liquid discharge apparatus including a liquid discharge portion that discharges a liquid from a nozzle, a cap configured to form a closed space to which the nozzle opens by contacting the liquid discharge portion, a moisturizing liquid accommodating portion configured to accommodate a moisturizing liquid that moisturizes the cap, an accommodating body mounting portion to which an accommodating body that accommodates an adjusting liquid is detachably mounted, the adjusting liquid being for adjusting a concentration of the moisturizing liquid, and a replacement detecting portion configured to detect replacement of the accommodating body mounted on the accommodating body mounting portion, the control method comprising:

detecting the replacement of the accommodating body mounted in the accommodating body mounting portion; and performing maintenance related to the moisturizing liquid, wherein when replacement of the accommodating body is detected, the maintenance related to the moisturizing liquid is restricted until a predetermined time elapses after the replacement of the accommodating body is detected.

10. The control method of a liquid discharge apparatus according to claim 9, further comprising:

measuring an ambient temperature of the liquid discharge apparatus, wherein the maintenance related to the moisturizing liquid is restricted when the ambient temperature of the liquid discharge apparatus is lower than a preset threshold value.

* * * * *